United States Patent
Pyhälammi et al.

(10) Patent No.: US 7,840,892 B2
(45) Date of Patent: Nov. 23, 2010

(54) ORGANIZATION AND MAINTENANCE OF IMAGES USING METADATA

(75) Inventors: Seppo Pyhälammi, Helsinki (FI); Juha Cavén, Tampere (FI); Ilari Lähteenmäki, Tampere (FI); Henri Roth, Tampere (FI)

(73) Assignee: Nokia Corporation, Espoo (FI)

( * ) Notice: Subject to any disclaimer, the term of this patent is extended or adjusted under 35 U.S.C. 154(b) by 821 days.

(21) Appl. No.: 10/651,211

(22) Filed: Aug. 29, 2003

(65) Prior Publication Data

US 2005/0050043 A1  Mar. 3, 2005

(51) Int. Cl.
*G06F 17/30* (2006.01)
*G06F 17/40* (2006.01)

(52) U.S. Cl. .............. 715/230; 715/231; 715/243; 715/273; 348/158

(58) Field of Classification Search ............ 707/3; 348/207, 158; 382/102; 715/517, 243, 230, 715/273, 231
See application file for complete search history.

(56) References Cited

U.S. PATENT DOCUMENTS

| | | | |
|---|---|---|---|
| 5,038,401 A | | 8/1991 | Inotsume |
| 5,537,528 A | * | 7/1996 | Takahashi et al. ......... 715/512 |
| 5,802,361 A | * | 9/1998 | Wang et al. ............ 382/217 |
| 5,946,444 A | | 8/1999 | Evans et al. |
| 6,437,836 B1 | | 8/2002 | Huang et al. |
| 6,954,543 B2 | * | 10/2005 | Svendsen et al. ......... 382/102 |
| 6,992,710 B2 | * | 1/2006 | Nagaoka ............... 348/231.2 |
| 7,010,144 B1 | * | 3/2006 | Davis et al. .............. 382/100 |
| 2001/0015756 A1 | * | 8/2001 | Wilcock et al. .......... 348/158 |
| 2001/0015759 A1 | | 8/2001 | Squibbs |
| 2002/0075322 A1 | | 6/2002 | Rosenzweig et al. |
| 2002/0078038 A1 | | 6/2002 | Kotani |
| 2002/0140820 A1 | | 10/2002 | Borden |

(Continued)

FOREIGN PATENT DOCUMENTS

EP  0115038  8/1984

(Continued)

OTHER PUBLICATIONS

U.S. Appl. No. 10/307,410, filed Dec. 2, 2002.

(Continued)

*Primary Examiner*—Stephen S Hong
*Assistant Examiner*—Wilson Tsui
(74) *Attorney, Agent, or Firm*—Banner & Witcoff Ltd.

(57) ABSTRACT

Data for electronic images is stored in a server. Metadata is assigned to each image file and categorizes each image according to one or more schemes. Possible metadata schemes include image date, one or more image subjects, and image location. The image files may then be searched based on the assigned metadata. Images may be stored in a database that includes at least one virtual folder corresponding to each metadata scheme, with each image having at least one entry in each folder. Each folder may further have subfolders that correspond to sub-categories of a categorization scheme. Each image may then have an entry in each subfolder which describes a part of the image metadata. A date search interface allows a user to select a year of interest, then a month, and then a day. A location search interface allows a user to select a subregion of a displayed region.

38 Claims, 24 Drawing Sheets

U.S. PATENT DOCUMENTS

| | | | |
|---|---|---|---|
| 2002/0188602 A1* | 12/2002 | Stubler et al. | 707/3 |
| 2003/0033296 A1* | 2/2003 | Rothmuller et al. | 707/3 |
| 2003/0081145 A1 | 5/2003 | Seaman et al. | |
| 2003/0126212 A1* | 7/2003 | Morris et al. | 709/205 |
| 2003/0217118 A1* | 11/2003 | Kobayashi et al. | 709/218 |
| 2004/0004663 A1* | 1/2004 | Kahn et al. | 348/207.1 |
| 2004/0189707 A1* | 9/2004 | Moore et al. | 345/777 |

FOREIGN PATENT DOCUMENTS

| | | |
|---|---|---|
| EP | 1087307 A | 3/2001 |
| EP | 1107209 A1 | 6/2001 |
| EP | 1150215 | 10/2001 |
| EP | 1150215 A | 10/2001 |
| EP | 1087307 | 3/2003 |
| GB | 2379116 | 2/2003 |
| WO | WO 02/057959 A | 7/2002 |
| WO | WO 02/085004 A1 | 10/2002 |
| WO | WO-03/047172 | 6/2003 |

OTHER PUBLICATIONS

U.S. Appl. No. 10/262,969, filed Oct. 3, 2002.
U.S. Appl. No. 10/263,193, filed Oct. 3, 2002.
U.S. Appl. No. 10/452,880, filed Jun. 3, 2003.
U.S. Appl. No. 10/417,230, filed Apr. 17, 2003.
European Search Report of EP 04 10 4064.3 dated Feb. 22, 2006.
Partial European Search Report of EP 04 10 4064 dated Dec. 7, 2005.

* cited by examiner

| | | | |
|---|---|---|---|
| 101 | [A] | March 3, 2002 | family portrait, father, me |
| 102 | [B] | July 1, 2002 | birthday, me |
| 103 | [C] | July 1, 2002 | birthday, me |
| 104 | [D] | August 6, 2002 | vacation, me |
| 105 | [E] | August 6, 2002 | vacation |
| 106 | [F] | August 6, 2002 | vacation, mother |
| 107 | [G] | December 21, 2002 | family portrait, mother, sister |
| 108 | [H] | December 22, 2002 | family portrait, mother, father |
| 109 | [I] | December 22, 2002 | cat |
| 110 | [J] | December 22, 2002 | birthday, father |
| 111 | [K] | December 22, 2002 | birthday, father |

FIG. 4

ORGANIZATION AND MAINTENANCE OF IMAGES USING METADATA

FIELD OF THE INVENTION

The present invention relates generally to organizing, maintaining and accessing electronic data. More particularly, the invention concerns organizing, accessing and maintaining electronic image data so as to provide an interface for a user to browse, search and view electronically stored pictures.

BACKGROUND OF THE INVENTION

A variety of mobile computing devices exist, such as personal digital assistants (PDAs), mobile phones, digital cameras, digital players, mobile terminals, etc. These devices perform various functions specific to the device, and are often able to communicate (via wired or wireless connection) with other devices. A single mobile device may, for example, provide Internet access, maintain a personal calendar, provide mobile telephony, and take digital photographs. However, memory capacity is typically limited on mobile devices. Wireless telephones and other mobile devices that create digital photographs, video segments and audio segments must store those segments. Storage of these items usually requires a relatively large amount of memory.

One approach to managing memory constraints on mobile devices is to transfer files to other devices, such as a remotely-located personal computer or dedicated storage equipment. A user may, for example, use a mobile terminal to take photographs, and periodically transfer those photographs to a server or other storage device located in the user's home or elsewhere. In this manner, the number of photographs a user may create (and retain) is not limited by the memory constraints of his or her mobile device. Methods and systems for viewing and otherwise accessing stored images in a mobile network are described in commonly-assigned U.S. patent application Ser. Nos. 10/307,410 (titled "Privacy Protection in a Server") and 10/262,969 (titled "Image Browsing and Downloading in Mobile Networks).

The increasing ease with which users can create and store digital images creates additional challenges, however. As more and more images accumulate, it becomes more and more difficult for a user to organize the images, as well as to find a particular stored image. Accordingly, there remains a need for improved systems and methods for organizing and accessing stored images.

SUMMARY OF THE INVENTION

Aspects of the present invention are directed to allowing a user to maintain data for electronic images and other types of information in a server coupled to a display such as a television set and having interfaces with one or more communication networks. Metadata is assigned to each image file and categorizes each image according to one or more schemes. Possible metadata schemes include the image date, one or more image subjects, and the geographic location of an image. The image files are then stored upon a server, and may subsequently be searched based on the assigned metadata. In one embodiment, images are stored in a database that includes at least one virtual folder corresponding to each metadata scheme, with each image having at least one entry in each folder. Each folder may further have subfolders that correspond to sub-categories of a categorization scheme. Each image may then have an entry in each subfolder which describes a part of the image metadata.

In other aspects of the invention, user interfaces are provided for searching stored images according to the metadata assigned to each image. A date search interface allows a user to select a year of interest, then a month, and then a day. A location search interface allows a user to select a subregion of a displayed region. These and other features of the invention will be apparent upon consideration of the following detailed description of preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 4 is a table showing example images and metadata used for further description of the invention.

DETAILED DESCRIPTION OF THE PREFERRED EMBODIMENTS

In the following description of various illustrative embodiments, reference is made to the accompanying drawings that form a part thereof, and in which is shown by way of illustration various embodiments in which the invention may be practiced. It is to be understood that other embodiments may be utilized and structural and functional modifications may be made without departing from the scope of the present invention.

Example Operating Environment

Figure 1:
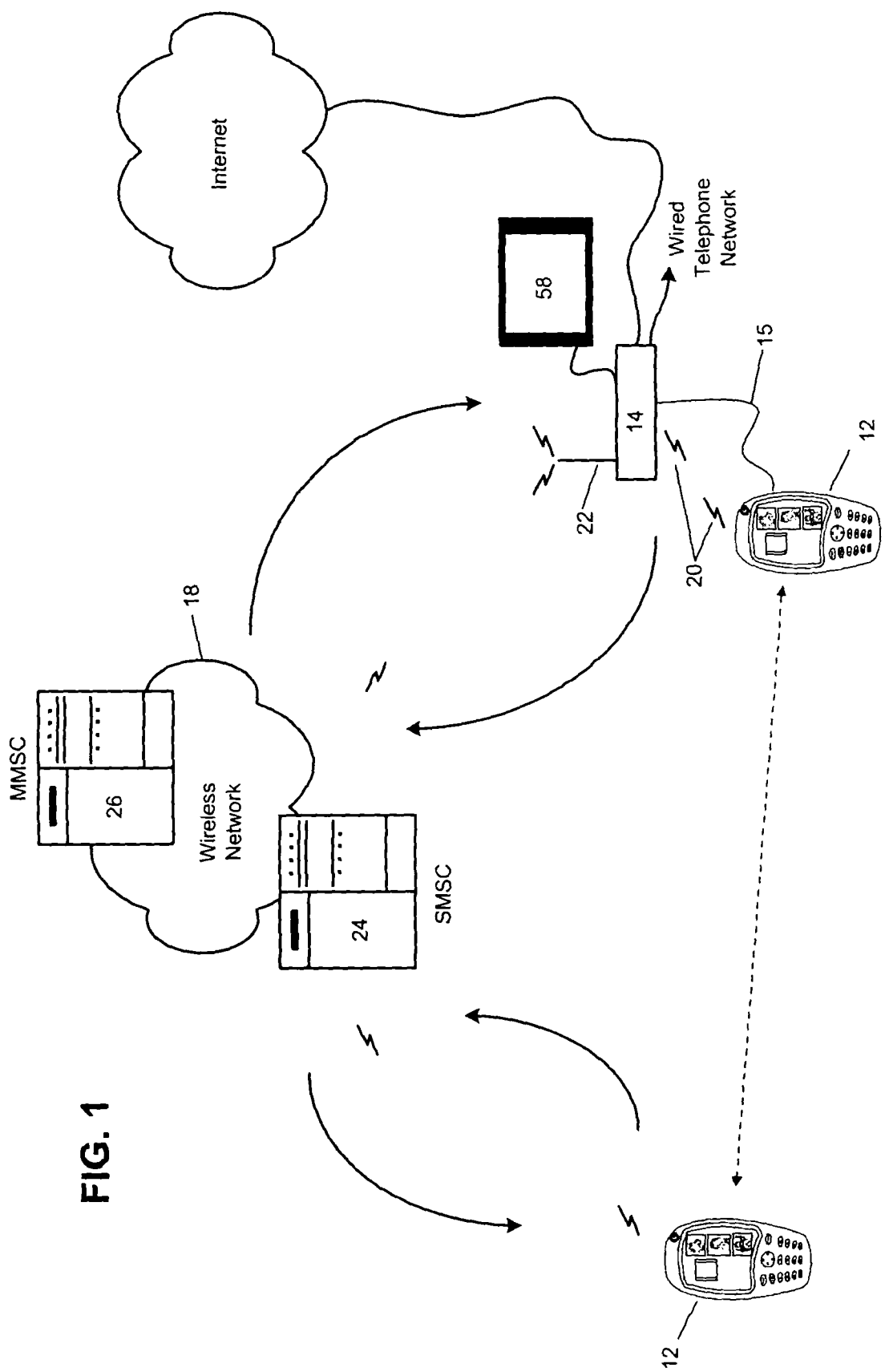
FIG. 1 is a block diagram of an example of a wireless communication system in which various aspects of the present invention may be implemented.

FIG. 1 shows an example of a wireless communication system 10 in which the systems and methods of the present invention may be advantageously employed. One or more network-enabled mobile devices 12, such as a personal digital assistant (PDA), digital camera, cellular phone, mobile terminal, or combinations thereof, is in communication with a server 14. Although not shown in FIG. 1, server 14 may act as a file server for a network such as home network, some other Local Area Network (LAN), or a Wide Area Network (WAN). Server 14 may be a personal computer, a mainframe, a television set-top box, or other device capable of storing and accessing data. Mobile device 12 may communicate with server 14 in a variety of manners. For example, mobile device 12 may communicate with server 14 via wireless network 18. Wireless network 18 may be a third-generation (3G) cellular data communications network, a Global System for Mobile communications network (GSM), or other wireless communication network. Mobile device 12 may also have one or more ports allowing a wired connection to server 14 via, e.g., universal serial bus (USB) cable 15. Mobile device 12 may also be capable of short-range wireless connection 20 (e.g., a BLUETOOTH link) to server 14. A single mobile device 12 may be able to communicate with server 14 in multiple manners.

Server 14 may act as a repository for storing files received from mobile device 12 and from other sources. Server 14 may have, or be coupled to, a wireless interface 22 configured to transmit and/or receive communications (such as messages, files, or other data) with mobile network 18. Server 14 may alternatively (or also) have one or more other communication network connections. For example, server 14 may be linked (directly or via one or more intermediate networks) to the Internet, to a conventional wired telephone system, or to some other communication network.

In one embodiment, mobile device 12 has a wireless interface configured to send and/or receive digital wireless communications within wireless network 18. As part of wireless network 18, one or more base stations (not shown) may support digital communications with mobile device 12 while the mobile device is located within the administrative domain of wireless network 18. The base station of wireless network 18 that is in communication with mobile device 12 may be the same or a different base station that is in communication with server 14. Indeed, mobile device 12 and server 14 may each be in communication with different wireless networks (e.g., mobile device 12 could be roaming), which could in turn be interlinked via one or more intermediate wired or wireless networks. For simplicity, server 14 and mobile device 12 are shown within the same wireless network 18.

Mobile device 12 communicates with server 14 via wireless network 18 and is configured to transmit data (such as, e.g., electronic images) for remote storage on server 14. Mobile device 12 may also be configured to access data previously stored on server 14. In one embodiment, file transfers between mobile device 12 and server 14 may occur via Short Message Service (SMS) messages and/or Multimedia Messaging Service (MMS) messages transmitted via short message service center (SMSC) 24 and/or a multimedia messaging service center (MMSC) 26. Although shown as part of network 18, SMSC 24 and MMSC 26 may be part of another network or otherwise outside of network 18. Although shown as separate logical entities, SMSC 24 and MMSC 26 could be a single entity. Further, SMSC 24 and MMSC 26 may coordinate via signaling between themselves for improving the file transfer process. For example, because SMSC 24 and MMSC 26 may be store-and-forward systems, rather than real-time systems, a file requested via an SMS message from mobile device 12 may still reside on MMSC 26 based upon a previous request. As such, SMSC 24 may copy MMSC 26 on an SMS file request and, if applicable, MMSC 26 may notify the user of the previously stored file. Further, MMSC 26 may simply transfer the requested file based on its stored copy of the file. In other embodiments, MMSC 26 may act as a repository for files, and mobile device 12 may simply request transfer of files from MMSC 26.

Figure 2:
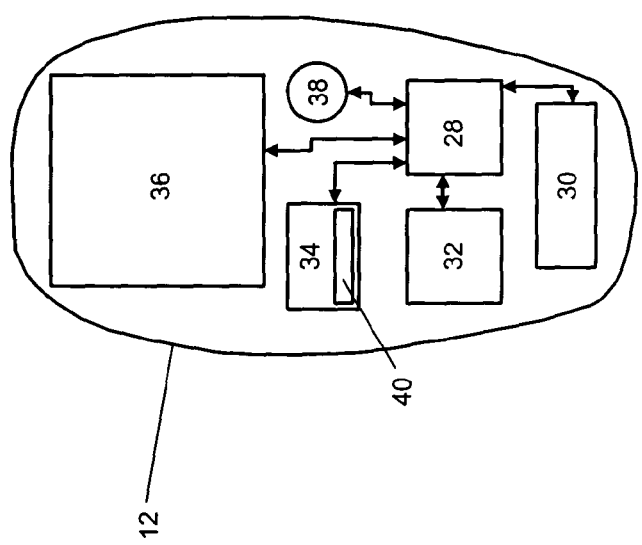
FIG. 2 is a block diagram of an illustrative mobile device according to at least one embodiment of the invention.

As shown in FIG. 2, mobile device 12 may include processor 28 connected to user interface 30, wireless communications interface 32, memory 34 and/or other storage, display 36, and digital camera 38. User interface 30 may further include a keypad, touch screen, voice interface, or the like. Software 40 may be stored within memory 34 and/or other storage to provide instructions to processor 28 for enabling mobile device 12 to perform various functions. For example, software 40 may configure processor 28 to enable mobile device 12 to take digital photographs via digital camera 38, to automatically name a photograph (as described below), to save photographs as image files, to transfer image files to server 14, to retrieve and display image files from server 14, and to browse the Internet using communications interface 32. Although not shown, communications interface 32 could include additional wired (e.g., USB) and/or wireless (e.g., BLUETOOTH) interfaces configured to communicate over different communication links.

Figure 3:
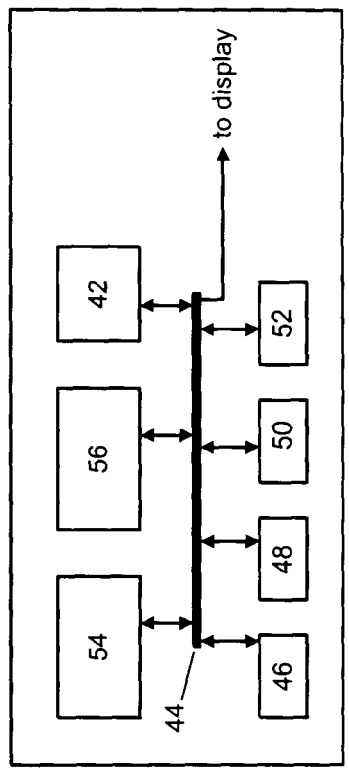
FIG. 3 is a block diagram of a server according to at least one embodiment of the invention.

As shown in FIG. 3, server 14 may include processor 42 coupled via bus 44 to one or more communications interfaces 46, 48, 50 and 52. Interface 46 may be a cellular telephone or other wireless network communications interface. Interface 48 may be a conventional wired telephone system interface. Interface 50 may be a cable modem. Interface 52 may be a BLUETOOTH interface. Server 14 may also include volatile memory 54 (e.g., RAM) and/or non-volatile memory 56 (such as a hard disk drive, tape system, or the like). Software may be stored within memory 54 and/or memory 56 that provides instructions to processor 42 for enabling server 14 to perform various functions, such as processing file transfer requests (such as for image files) and storing files in memory 54 or memory 56. Although shown as part of server 14, memory 56 could be remote storage coupled to server 14, such as an external drive or another storage device in communication with server 14. Preferably, server 14 also includes or is coupled to a display device 58 (FIG. 1) via a video interface (not shown). Display 58 may be a computer monitor, a television set, or other type of display device.

Organization and Maintenance of User Data

According to one embodiment of the invention, a method is provided for organizing and accessing files stored on a device such as server 14. Although the following description refers to photographic image files received from one or more mobile devices 12, the invention is not limited by data type or source.

As images are created by mobile device 12 and/or as those images are stored on server 14, each image is categorized according to one or more schemes, and metadata corresponding to that characterization is associated with each image. In one embodiment, mobile device 12 generates that metadata when a user creates an image with digital camera 38, and mobile device 12 includes the metadata as part of the image data file. After transferring the image to server 14 (or elsewhere) for storage, a user can locate the image based on that metadata. The user may also (or alternatively) add metadata to an image when the image is created and/or at a another point in time.

In one embodiment, the metadata for each image includes information categorized by at least two schemes: time of the image creation and subject(s) of the image. The subject description of the image may also be used as a title for the image. A separate folder is created for each metadata scheme, and each image is cross-referenced in each folder. A user is then able to search or browse for images based on either scheme. Continuing with the example, a user can search for an image by looking for an image taken on a certain date (or in a certain date range). Alternatively, the user could search for an image based on a subject of the image. Images can be further categorized by providing a separate folder for each user. Each user's folder could in turn contain two subfolders: one that organizes images by date and one that organizes images by title/subject. A user may further be able to create additional folders and subfolders to group images as the user desires. Even within the user-defined groupings, however, images are still searchable based on the previously assigned metadata.

FIG. 4 is a table setting forth several images that a user may have taken with mobile terminal 12. The table of FIG. 4 would not necessarily exist in the invention. Instead, FIG. 4 is merely provided to introduce samples of image data that may be organized and stored according to an embodiment of the invention. For simplicity, symbols in the left hand column represent the actual images. The images can be created or stored in any file format, including but not limited to JPEG images, etc. In the center column is a date assigned to each image. This date would typically, though not necessarily, be the date the image was created. In the right hand column are subject descriptions for the images.

Figure 5:
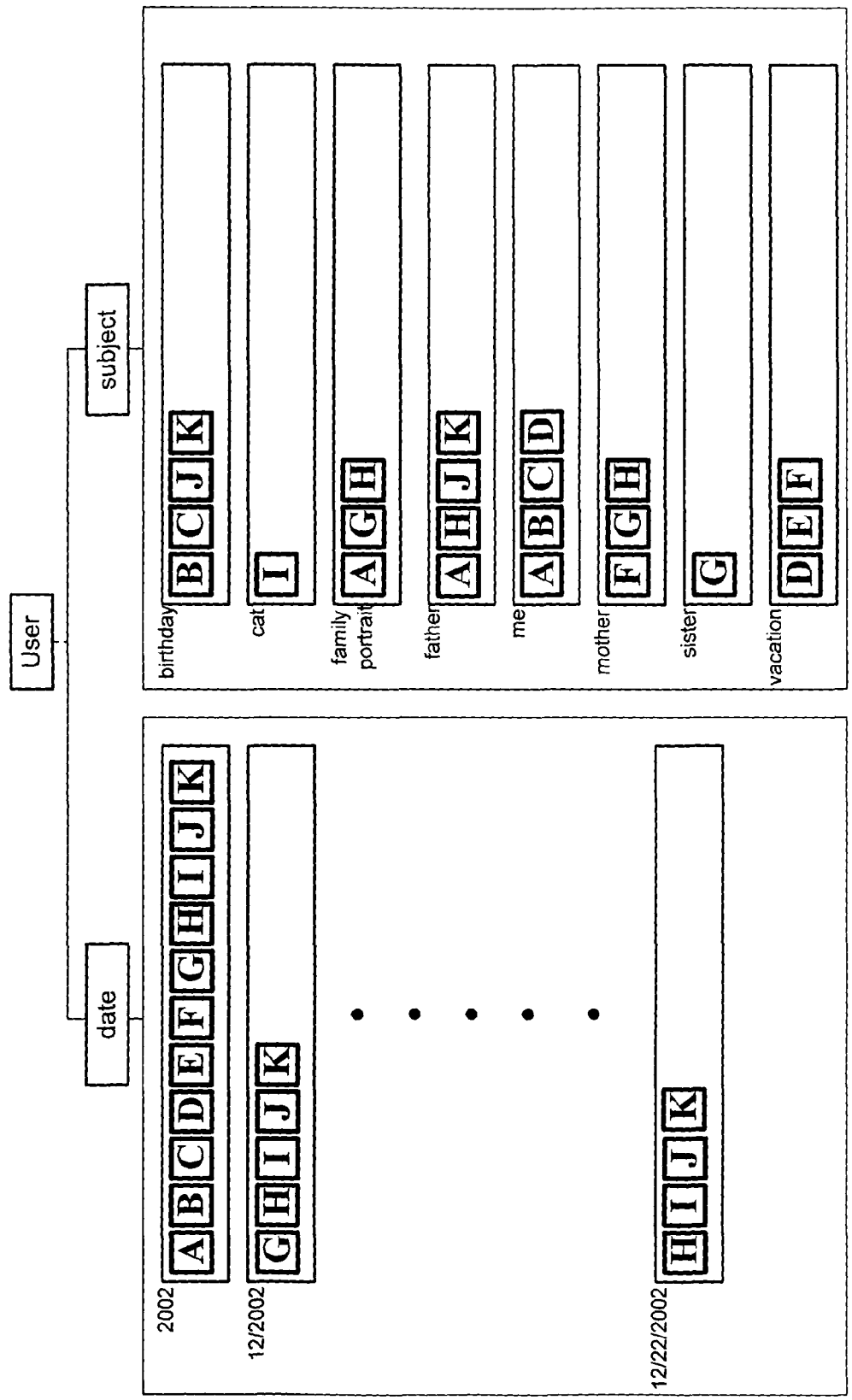
FIG. 5 is a block diagram of a virtual folder and sub-folder structure according to at least one embodiment of the invention.

FIG. 5 shows, in a hierarchical format, how the images in FIG. 4 can be organized into one or more virtual folders. Although the following description refers to placing each image in multiple folders and subfolders, an actual copy of the image data file would not necessarily be placed in a separate location for each folder or subfolder. In one embodiment, a copy of each image file would be stored in a single location within storage 56, and a pointer to the image file location placed in each appropriate folder/subfolder. As shown in FIG. 5, the example images of FIG. 4 are arranged by date in one folder and arranged again by subjects in another folder. Within the date folder, images are further arranged by more specific dates into virtual subfolders, also called "albums." In the example of FIG. 5, there are separate subfolders for each year, for each month of the year, and for each day of each month. Similarly, the subject folder of FIG. 5 includes subfolders for "birthday," "cat," "family portrait," etc. The subfolders shown in FIG. 5 are merely examples, and other arrangements are within the scope of the invention. The date and subject folders could contain many other subfolders in addition to or instead of those shown. For example, each time a user stores an image, the user could be prompted to describe subjects of the image. Using image 111 in FIG. 4 as an example, the user could be prompted (upon seeking to store the image on server 14) for one or more keywords to describe the image. If image 111 is a picture of the user's father opening a present at a birthday party, the user might enter "birthday" and "father" as subjects. Depending upon the system configuration and upon how detailed the user wished to be, the user could also (or alternatively) provide other keywords, such as "party," "present," etc. If image 111 is the first image stored on server 14, or if other images with the same subject keywords were not previously stored, server 14 could create separate subfolders for "birthday," "father," etc. Because image 111 is chronologically subsequent to other images having "birthday" and "dad" as subject matter keywords, however, "birthday" and "father" albums already exist in the example.

As each image is stored, the image (or a pointer or other index to the image data) is placed in each applicable subfolder in the date and subject folders. In other words, each image is placed into each folder and subfolder which describes some part of the metadata for that image. Each image can thus appear in multiple places within the date folder and within the subject folder. For example, images 110 and 111 in FIG. 4 are both dated Dec. 22, 2002 and are birthday pictures of "father." Those images therefore appear in the date folder in the subfolder for 2002, in the subfolder for December 2002 and in the subfolder for Dec. 22, 2002. Images 110 and 111 further appear in the subfolders for "birthdays" and for "father" in the subject folder. The remaining images 101-109 in FIG. 4 are similarly shown in the appropriate subfolders of FIG. 5.

Figure 6:
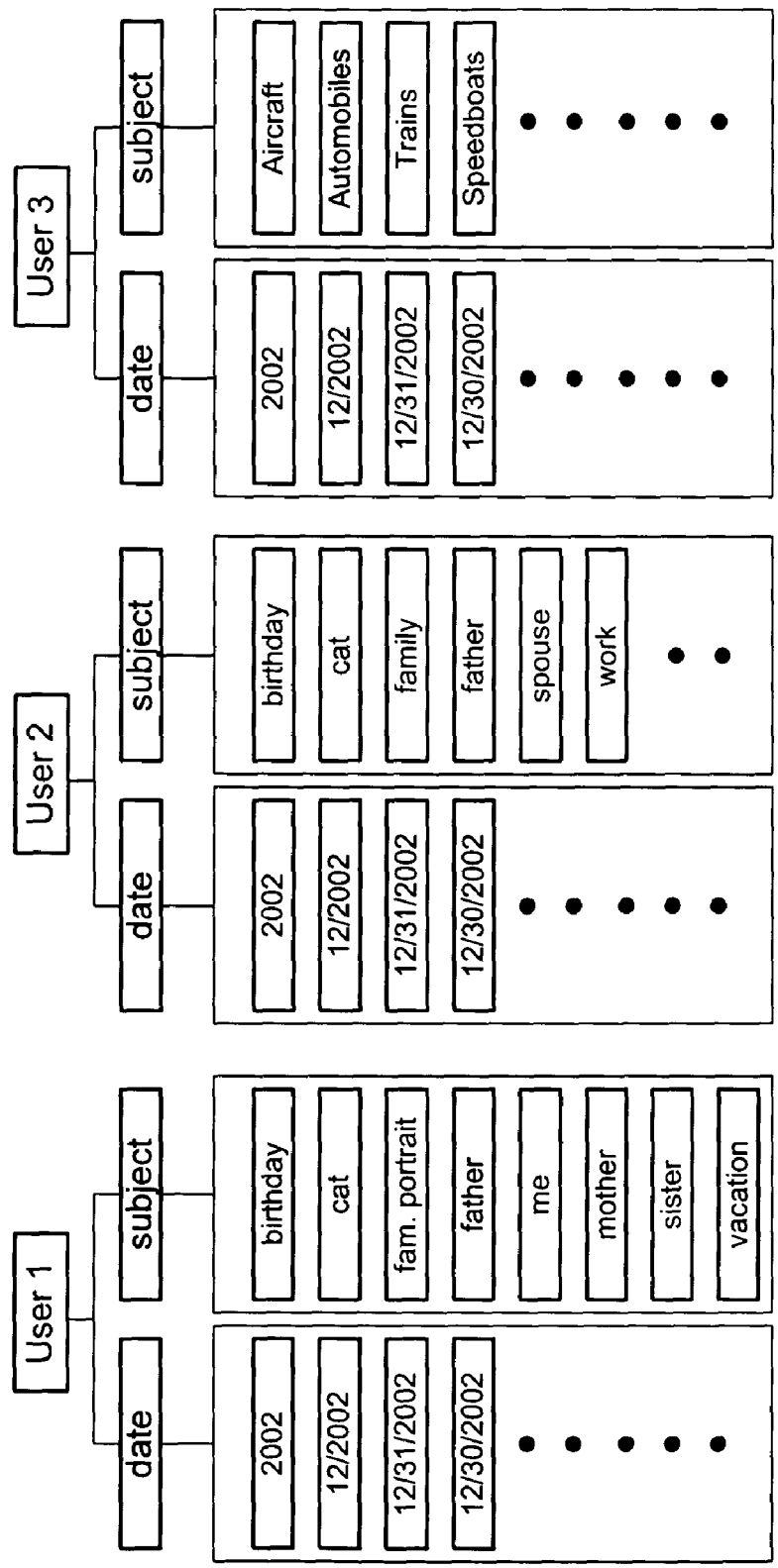
FIG. 6 is a block diagram of a virtual folder and sub-folder structure according to another embodiment of the invention.

In other embodiments, multiple users could store images in server 14, with the images organized by user. As shown in FIG. 6, each user ("User 1," "User 2" and "User 3") could have his or her own collection of folders and subfolders. Moreover, each user need not necessarily organize images in the same manner. For example, User 2 has some subject subfolders that are the same as those of User 1 and others which User 1 does not have. User 3 has subject subfolders that are completely different from those of Users 1 and 2. Although not shown, the date subfolders could also be different among the users.

The same image could be placed in the folders of different users. For example, one user may send an image to another user, or several users may both receive an image from an external source. Moreover, a user may protect his or her images (or only certain folders and/or subfolders) with a password. One method for such protection is described in the previously-mentioned application Ser. No. 10/307,410, which is incorporated by reference herein. For example, User 1 may allow anyone to access any of his image files, User 2 may password protect all of his image files, and User 3 may only password protect certain subfolders.

Figure 7:
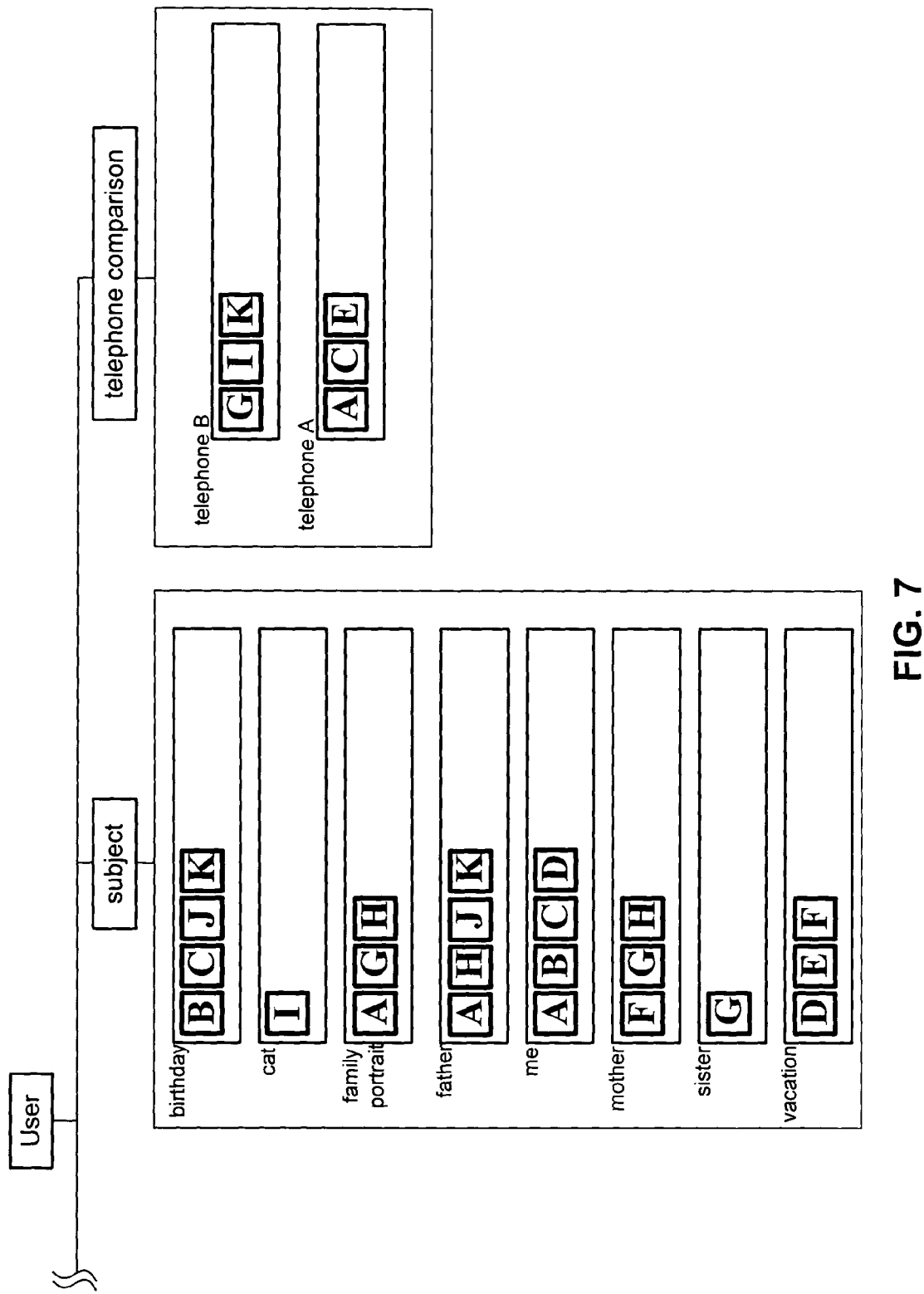
FIG. 7 is a block diagram of a virtual folder and sub-folder structure according to yet another embodiment of the invention.

In other embodiments, a user may also be able to categorize images into additional user-defined albums which may not coincide with albums in the date or subject folders. A user may further be able to group those user-defined albums into higher level "box" folders. For example, at some date after images 101-111 have been stored in server 14, User 1 could decide images 107, 109 and 111 have some common feature and should be quickly retrievable in a group, and that images 101, 103 and 105 likewise should be grouped together and quickly retrievable as a group. As one possibility, images 107, 108 and 109 could have been created with one mobile device and images 101, 103 and 105 created with another; User 1 may wish to compare the quality of images from the different mobile devices. As shown in FIG. 7, User 1 might then place images 101, 103 and 105 in an album called "telephone A" and images 107, 109 and 111 in an album called "telephone B." User 1 might then place the telephone A and telephone B albums into a box called "telephone comparison." So as not to obscure the drawing with unnecessary detail, the date folder is omitted in FIG. 7. As described in more detail below, the images in the newly created albums are still searchable based on the date and subject metadata, but are now also locatable based on a user defined structure.

Figure 8:
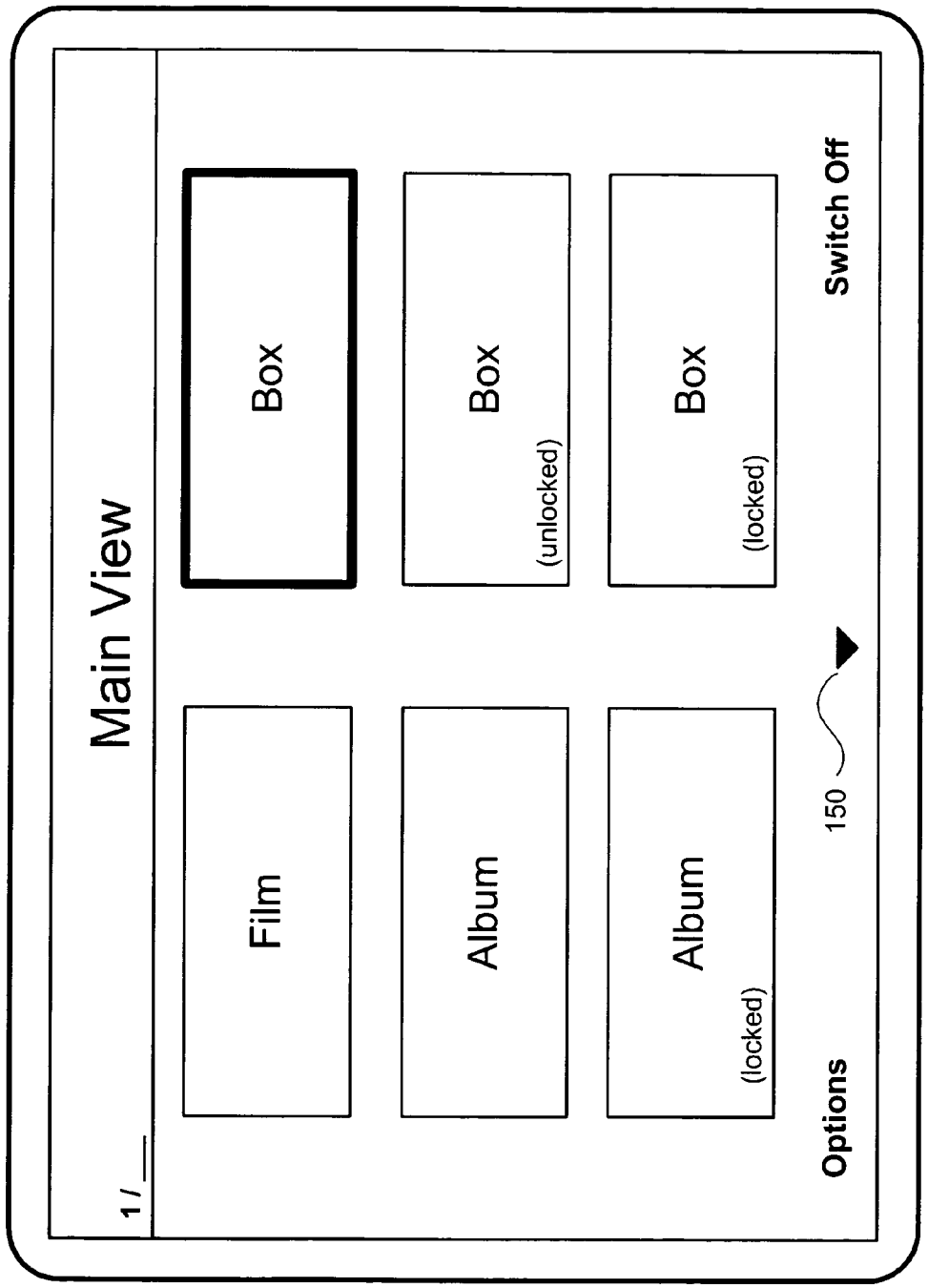
FIG. 8 is a diagram showing a top level user interface according to at least one embodiment of the invention.

FIG. 8 shows one example of a top-level ("Main View") user interface provided to a user by server 14 according to one embodiment of the invention. In that embodiment, each user logs onto or otherwise identifies himself or herself to server 14, and is provided with a user interface specific to that user. In other words, each user can access an interface that allows that user to search or browse his or her image files. A user could also permit others to log onto the server using his or her identity and thereby access some or all of that user's image files. In at least one embodiment, server 14 displays the Main View in various ways. A user could access server 14 directly through a local input device, and server 14 could then display the interface of FIG. 8 on display device 58. Possible input devices include wired and wireless keyboards, mice and remote control units. Mobile device 12 could also function as a remote control unit and communicate with server 14 by BLUETOOTH or other wireless link, or via a cable connection to a port on mobile device 12. Server 14 could alternatively be accessed remotely via mobile device 12 or (other devices) via wireless network 18, via the Internet or via another communication network. If accessed remotely, server 14 would display the interface of FIG. 8 on display 36 of mobile device 12 (FIG. 2), upon a display screen of a remote PC, or on some other display device that is remotely located from server 14.

Upon reaching the interface of FIG. 8, a user can select a particular box or album to browse or search. The Main View interface could also present the user with the ability to browse or search all image files of that user, and not limit the search to individual boxes or albums. The Main View could also present the user with one or more system-generated boxes. For example, the system could automatically generate boxes corresponding to the "date" and "subject" folders for that user, as well as other groupings. As shown, some albums may be separately presented in the Main View. For example, the user may have created an album and not assigned it to a particular box, or a user may frequently access an individual album and thus move it outside of a particular box so as to be readily accessible from the Main View. In at least one embodiment, multiple boxes can be shown in the Main View. The user can also select a particular box and see, in an "album" view, only the albums in that box. After opening a particular box, a user could further choose a particular album within the box to browse or search.

The main view interface of FIG. 8 could also include other options. For example, video or audio clips could be separately selected (e.g., "film"). Certain albums and/or boxes could be indicated as locked (thereby requiring a password to access) or unlocked. If a user wished to prevent others from accessing some of his images, he could allow other users to log on with the user's identity, but password protect selected images, albums and/or boxes. If there are more boxes, albums or other items than can be shown on one screen, the interface advises of this (e.g., "1/_" where "_" is the total number of screens). By selecting an appropriate command or screen device, (e.g., symbol 151), the user can go to the next page.

Figure 9:
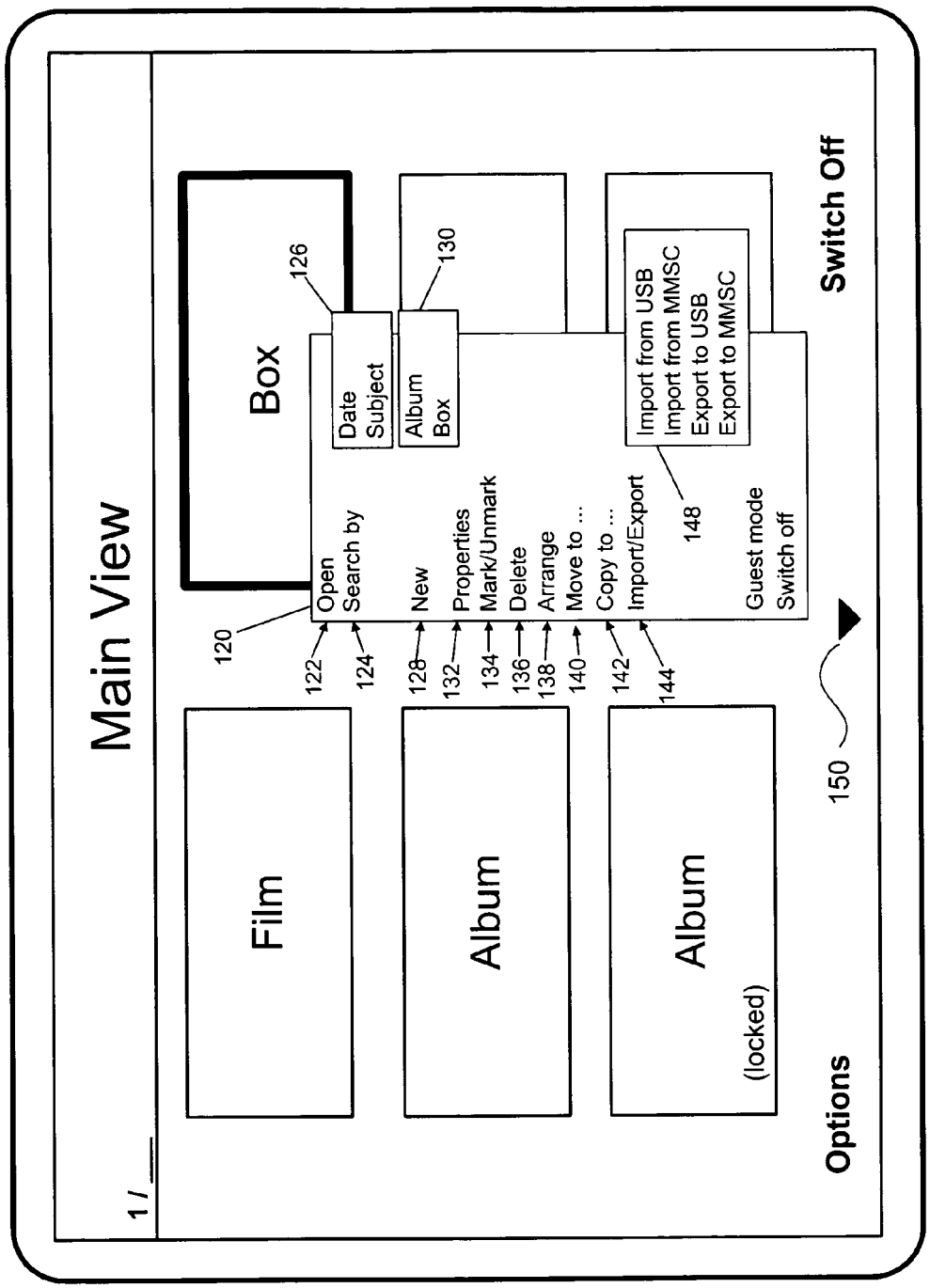
FIG. 9 is a diagram showing the top level user interface of FIG. 8 and a superimposed menu according to at least one embodiment of the invention.

FIG. 9 shows the Main View interface of FIG. 8, and further shows one example of a command menu 120 superimposed upon the Main View. From the Main View (and/or after selecting a box, album or other item in the Main View) and after choosing "Options," command menu 120 is presented. Although shown as a superimposed menu, command menu 120 could alternatively be presented as a drop down menu or in some other form. A menu could also have other commands not shown in menu 120, and/or lack various commands shown. "Open" command 122 allows a user to browse various albums within a box, or to browse various images within an album. "Search by" command 124 permits a user to search all images for that user. If the user had selected an album or box prior to accessing "Options" and choosing "Search by", the search would be of the selected box or album. "Search by" command 124 further provides the user with submenu 126 to search by date or subject. "New" command 128 allows a user (via submenu 130) to create new boxes or albums. "Properties" command 132 allows a user to view the date and subject information for an image, the file size of an image (or album or box), or other details about an image, album or box. "Mark/Unmark" command 134 permits the user to add various flags or labels to an image, album or box, or to password protect an image, album or box. "Delete" command 136 provides the usual deleting function, and "Arrange," "Move to" and "Copy to" commands 138, 140 and 142 provide a user with the ability to arrange, relocate and copy images. "Import/Export" command 144 is used to import and export image files into and out of server 14. As shown in submenu 148, a user could, after connecting a mobile device to server 14 via USB cable 15 (FIG. 1) select "import from USB." The user would then be provided with one or more additional menus allowing the user to provide the necessary metadata (if required metadata is not already part of the image file), to place the image into an album, etc. Similarly, a user may have previously downloaded images from a mobile terminal to a MMSC (such as MMSC 26 in FIG. 1). By selecting the "Import from MMSC" command, the user would then be presented with one or more additional menus to facilitate download from the MMSC and storage of the image. The "Export to USB" and "Export to MMSC" commands would, as suggested, be used to export image files from server 14 to an attached USB device or to a MMSC, to an Internet address, or to some other destination. The "Guest Mode" command 146 permits a user to log on as another user, as described above.

Figure 10A:
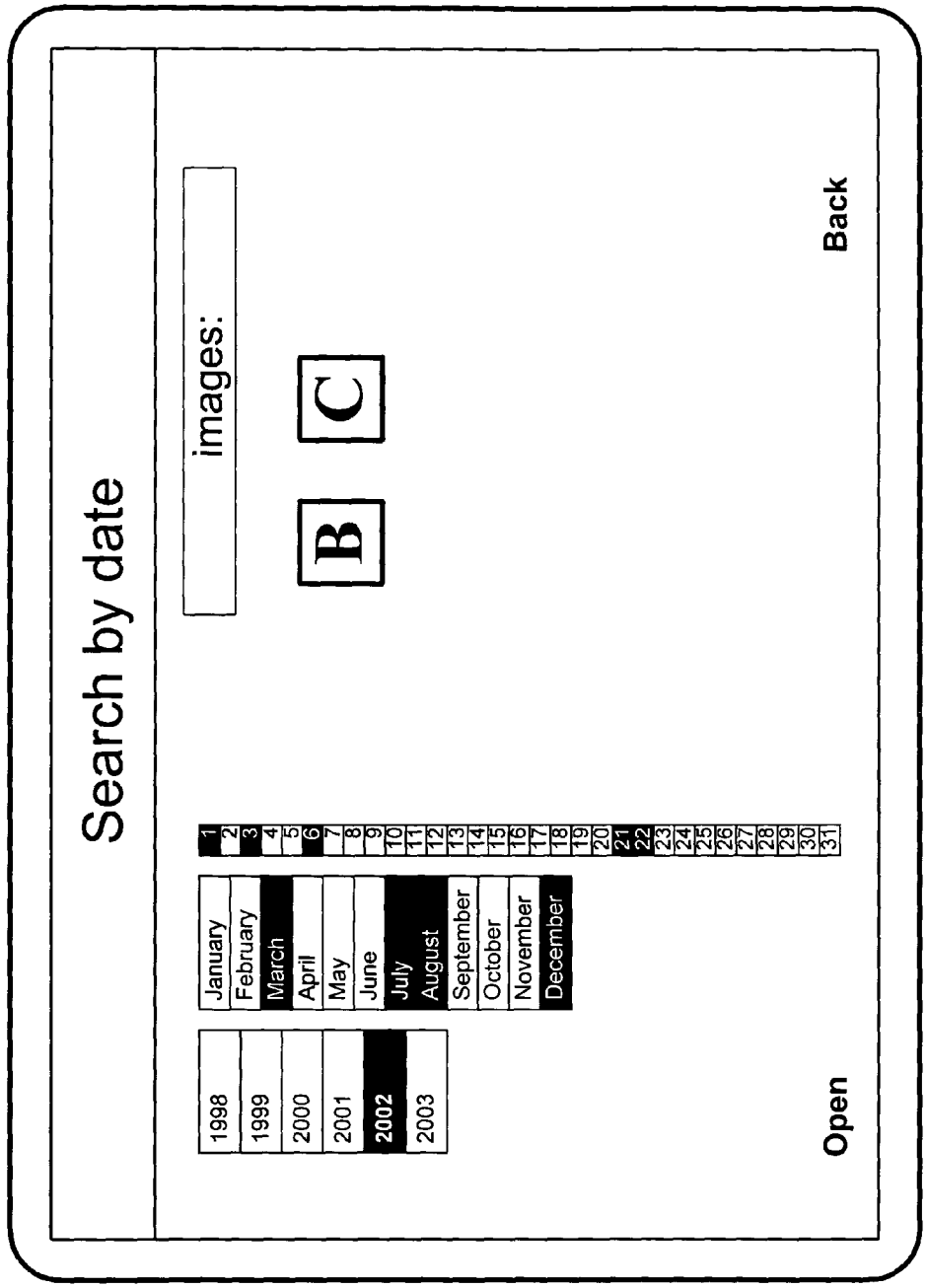
FIGS. 10A-10D are examples of user interfaces for a date search of images according to at least one embodiment of the invention.

FIGS. 10A-10D are examples of search screens for a date search of a user's images, or of a specific album or box, via command 124 and submenu 126 (FIG. 9). In the example of FIGS. 10A-10D, User 1 is searching, within all images associated with User 1, for images created on Dec. 22, 2002. FIG. 10A shows an initial interface User 1 would see upon selecting a date search. All years, months and days for which there are available images are highlighted or otherwise visually marked as selectable. In other embodiments, only the color of the date is changed (i.e., there is no change in the surrounding background color); the years, months and/or days can be marked in various other manners. As also shown in FIG. 10A, and prior to a user selecting a year, month or day, thumbnails are shown on the right side of the screen. In one embodiment, one of the days for which there are available images is randomly selected by processor 42 (FIG. 3), and images for that day shown. In other embodiments, the selection may not be random, e.g., processor 42 could show thumbnail images for the first day for which there are images (as shown in FIG. 10A, where thumbnail images for July 1 are shown). Processor 42 could also choose the day (or other period) for which thumbnail images are presented in another manner.

Figure 10B:
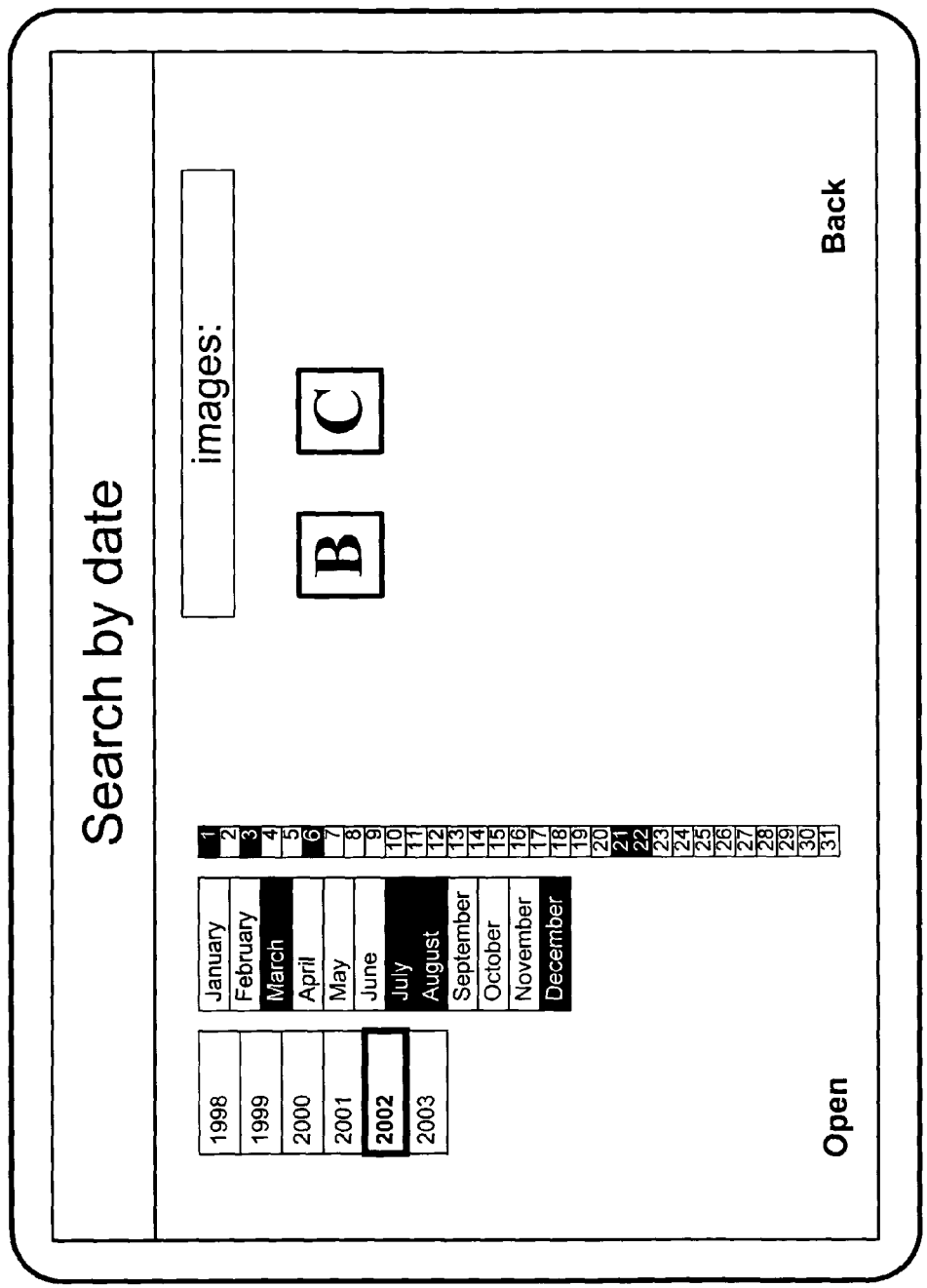

Upon selecting 2002, and as shown in FIG. 10B, that selection is shown. Until a day is selected, processor 42 continues to show thumbnail images for the day (or other period) previously chosen by processor 42. In other embodiments, after the user selects a year, processor 42 picks (randomly or in another manner) another day for which images will be shown.

Figure 10C:
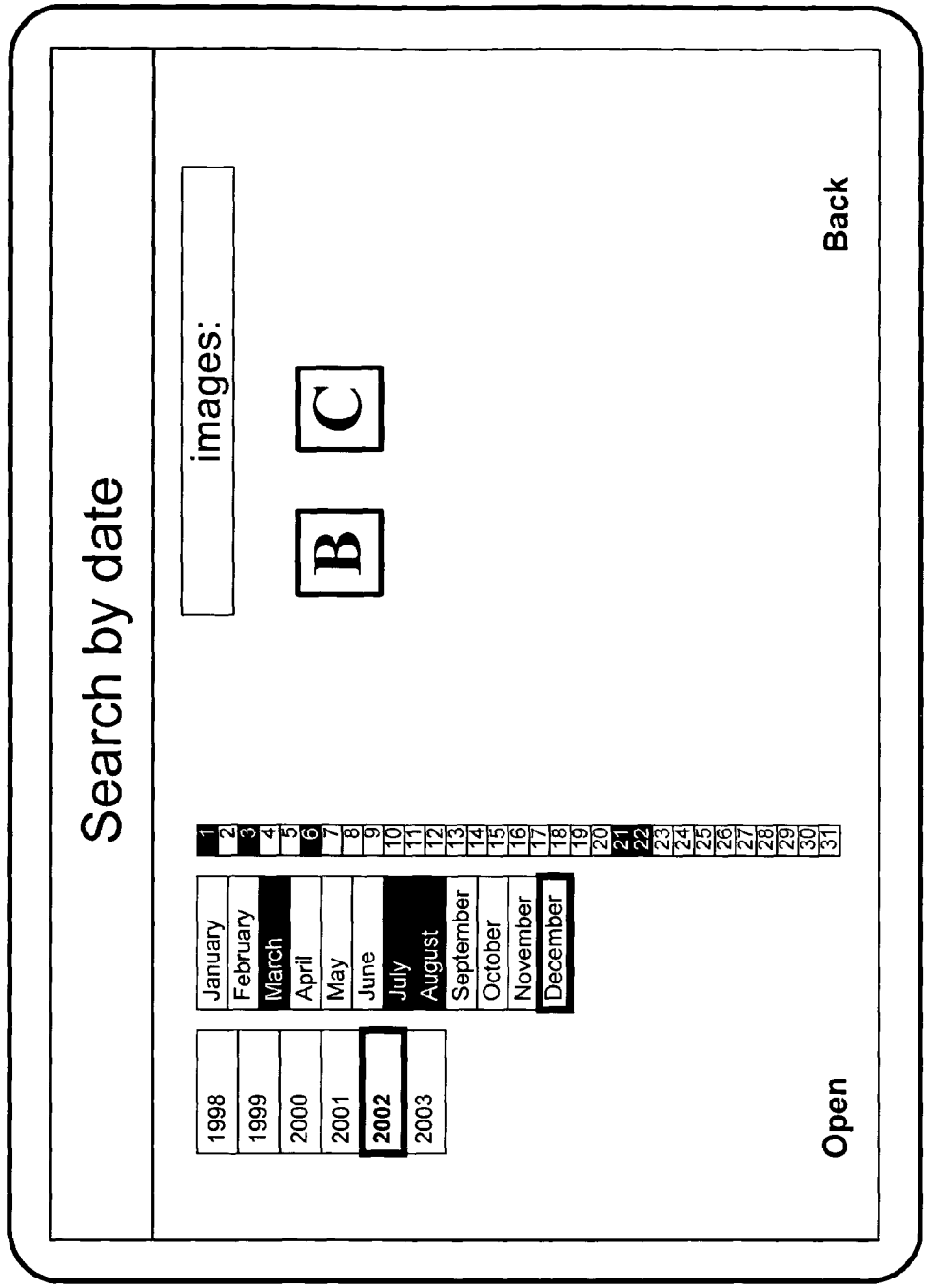

Upon selecting December, and as shown in FIG. 10C, the selected month is indicated. In the example of FIG. 10C, the non-selected months (March, July, August) remain highlighted; in other embodiments, the non-selected months cease to be highlighted after the user selects a month. Processor 42 continues to choose (either randomly or in another manner) the thumbnails shown.

Figure 10D:
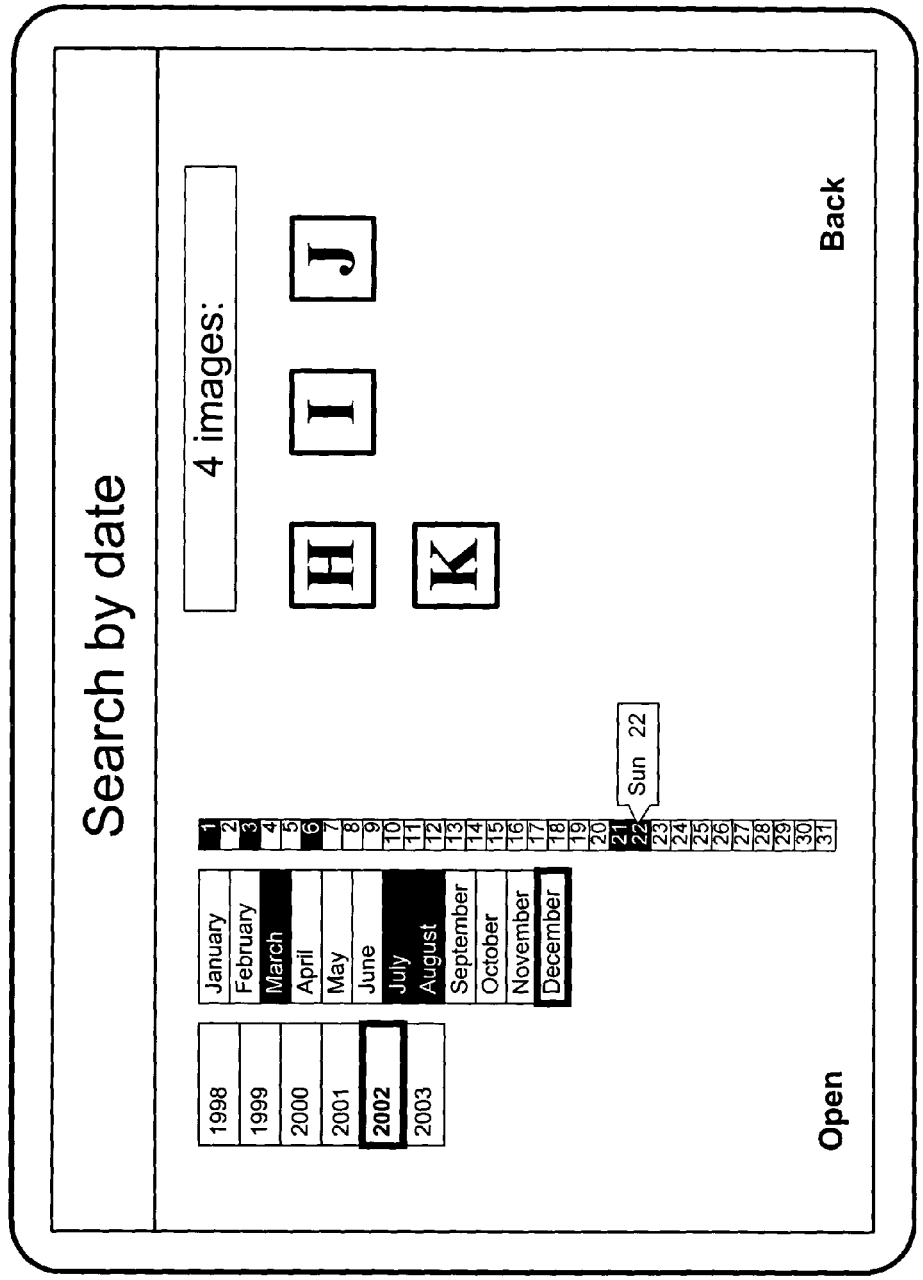

As shown in FIG. 10D, User 1 then selects the day (22), and only thumbnails for those images associated with User 1 and Dec. 22, 2002 are displayed. Depending on system configuration and the number of thumbnails, the screen could prompt the user to scroll or turn to a different page to view additional thumbnails (using, e.g., the "1/_" and symbol 150 displays as in the Main View of FIG. 8). If the user selects a highlighted day which is not one of the days of December 2002 for which there are images (e.g., if User 1 selected "3" instead of "22"), no thumbnail images are shown. In other embodiments, the user is otherwise advised that he or she has selected a day not corresponding to a day of the selected month having images. In still other embodiments, processor 42 could automatically change the month selection (e.g., processor 42 would change the month selection to March if User 1 selected "3"). At any point during the search process, User 1 can select one of the thumbnail images for full screen view, for export, for copying, for movement to a new file, or for other action. In other embodiments, no thumbnails are displayed until a user has selected a year, a month and a day. As another alternative (not shown), a user could enter a specific date (e.g., "12/22/2002") into a dialog or other command prompt, and go directly to any images for that date.

Figure 10E:
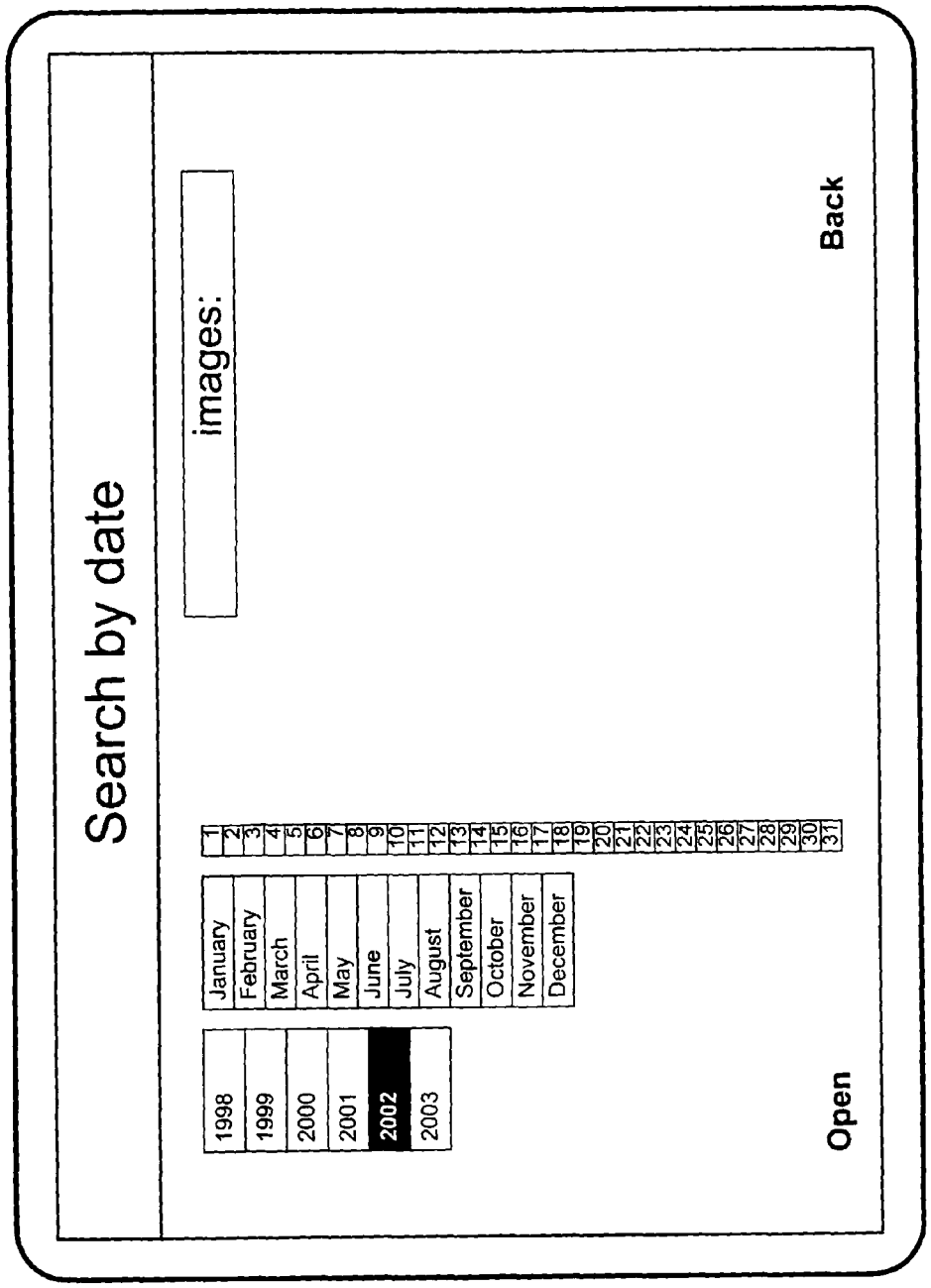
FIGS. 10E-10H are examples of user interfaces for a date search of images according to another embodiment of the invention.
Figure 10F:
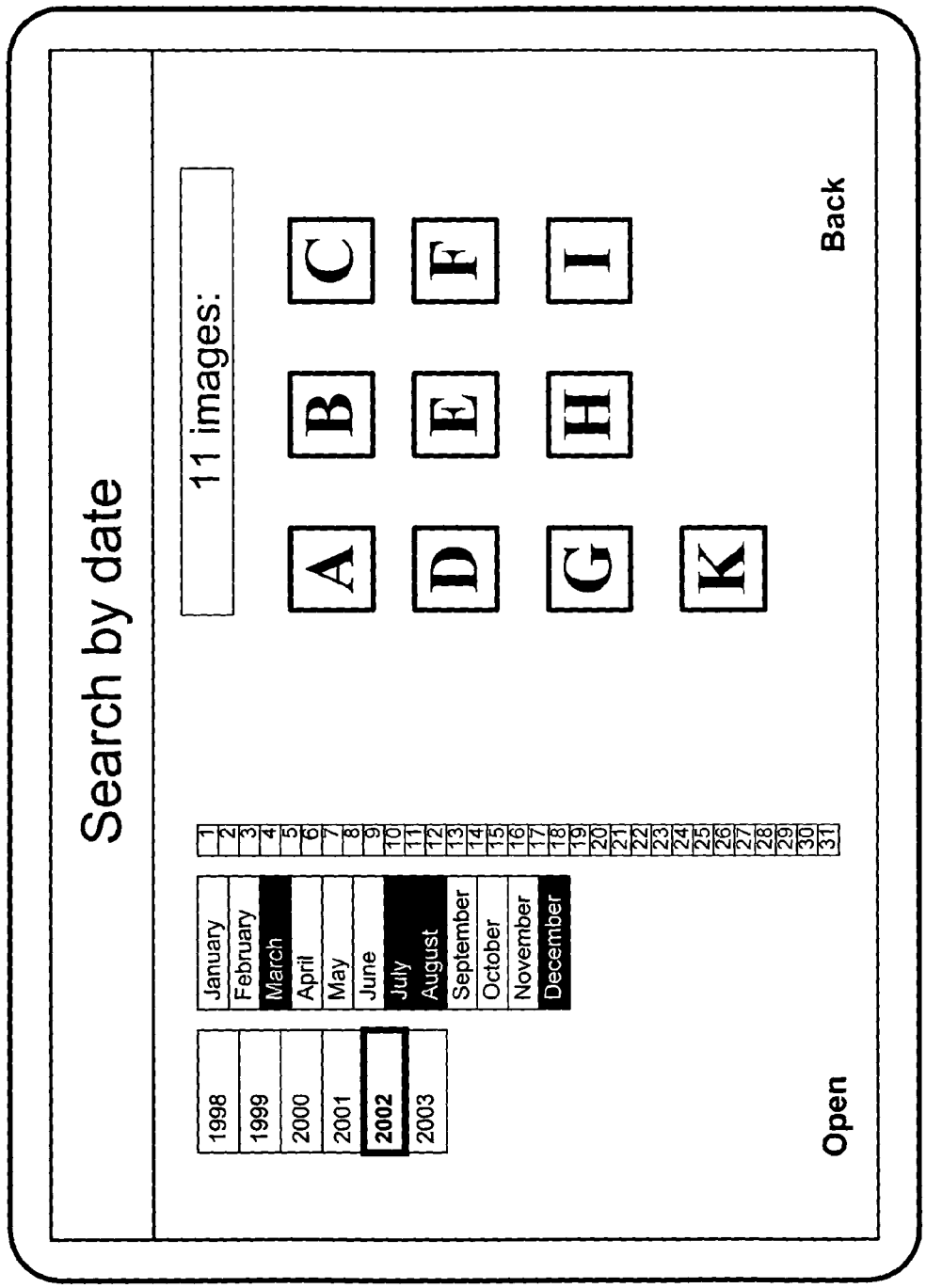
Figure 10G:
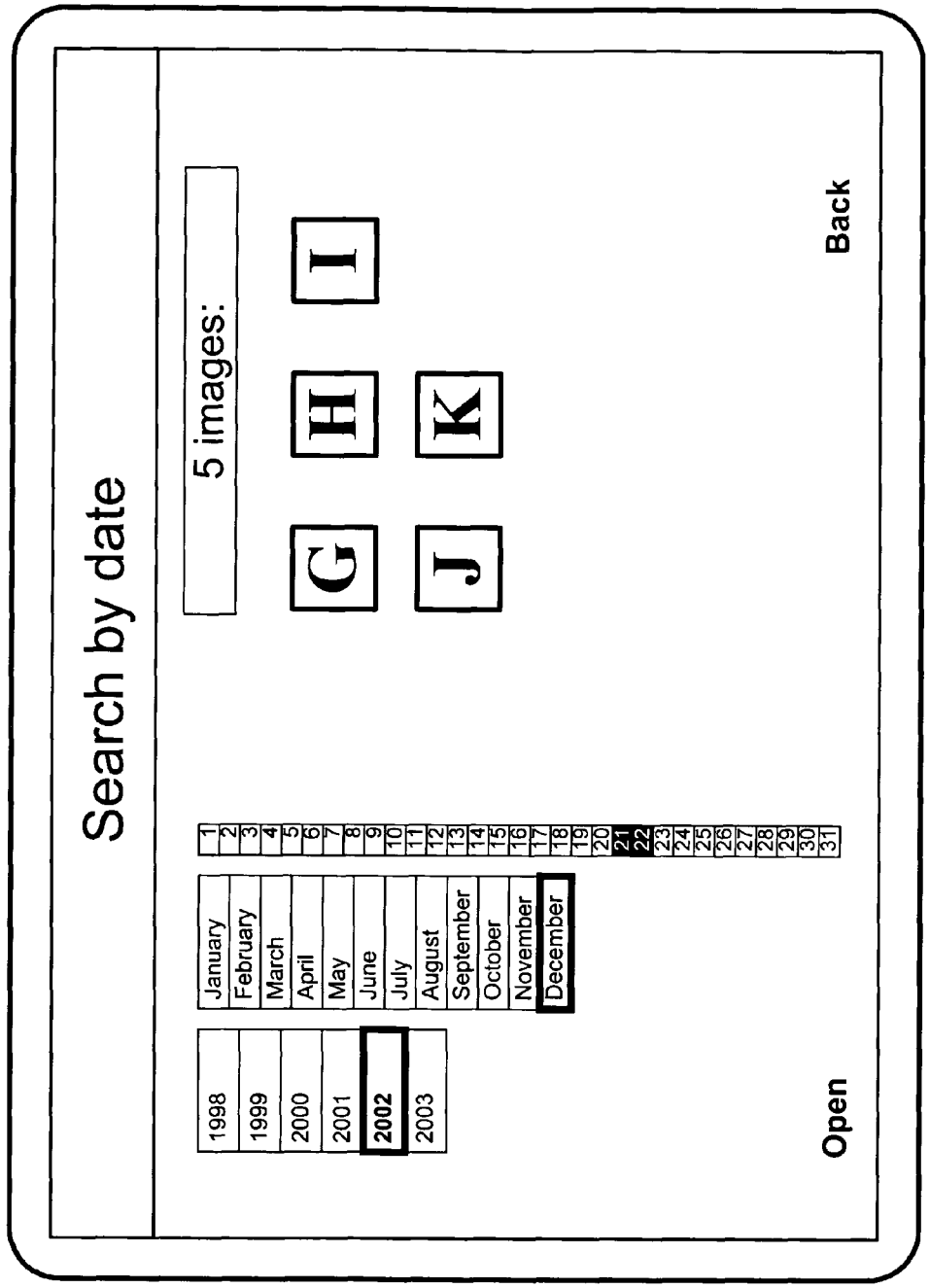
Figure 10H:
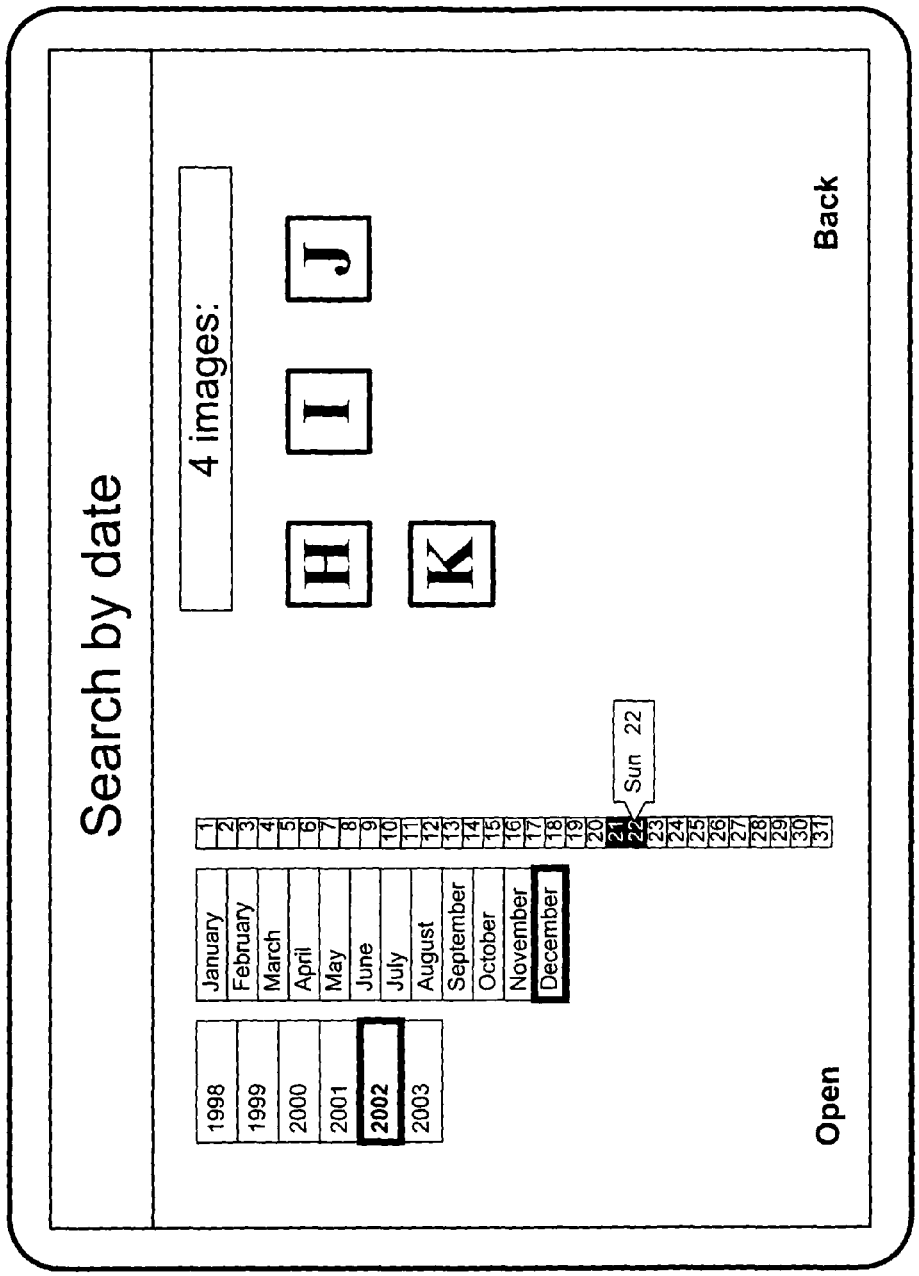

FIGS. 10E-10H are examples of additional embodiments of search screens for a date search of a user's images, or of a specific album or box, via command 124 and submenu 126 (FIG. 9). The examples of FIGS. 10E-10H are also based upon User 1 searching, within all images associated with User 1, for images created on Dec. 22, 2002. FIG. 10E shows an initial interface User 1 would see upon selecting a date search. Because all User 1 pictures are dated in 2002, only that year is highlighted or otherwise visually marked as selectable. Upon selecting 2002, and as shown in FIG. 10B, thumbnail images for all 2002 images of User 1 are displayed. Depending on system configuration and the number of thumbnails, the screen could prompt the user to scroll or turn to a different page to view additional thumbnails (using, e.g., the "1/_" and symbol 150 displays as in the Main View of FIG. 8). As also shown in FIG. 10B, only the months having associated image data are highlighted. Upon selecting December, and as shown in FIG. 10C, the number of thumbnails decreases to only the images for December 2002 and only the days of December 2002 having images are highlighted. As shown in FIG. 10D, User 1 then selects the day (22), and only thumbnails for those images associated with User 1 and Dec. 22, 2002 are displayed. As in the previously-described embodiments of FIGS. 10A-10D, User 1 can at any point select a thumbnail image for full screen view, for export, for copying, for movement to a new file, or for other action.

Figure 11A:
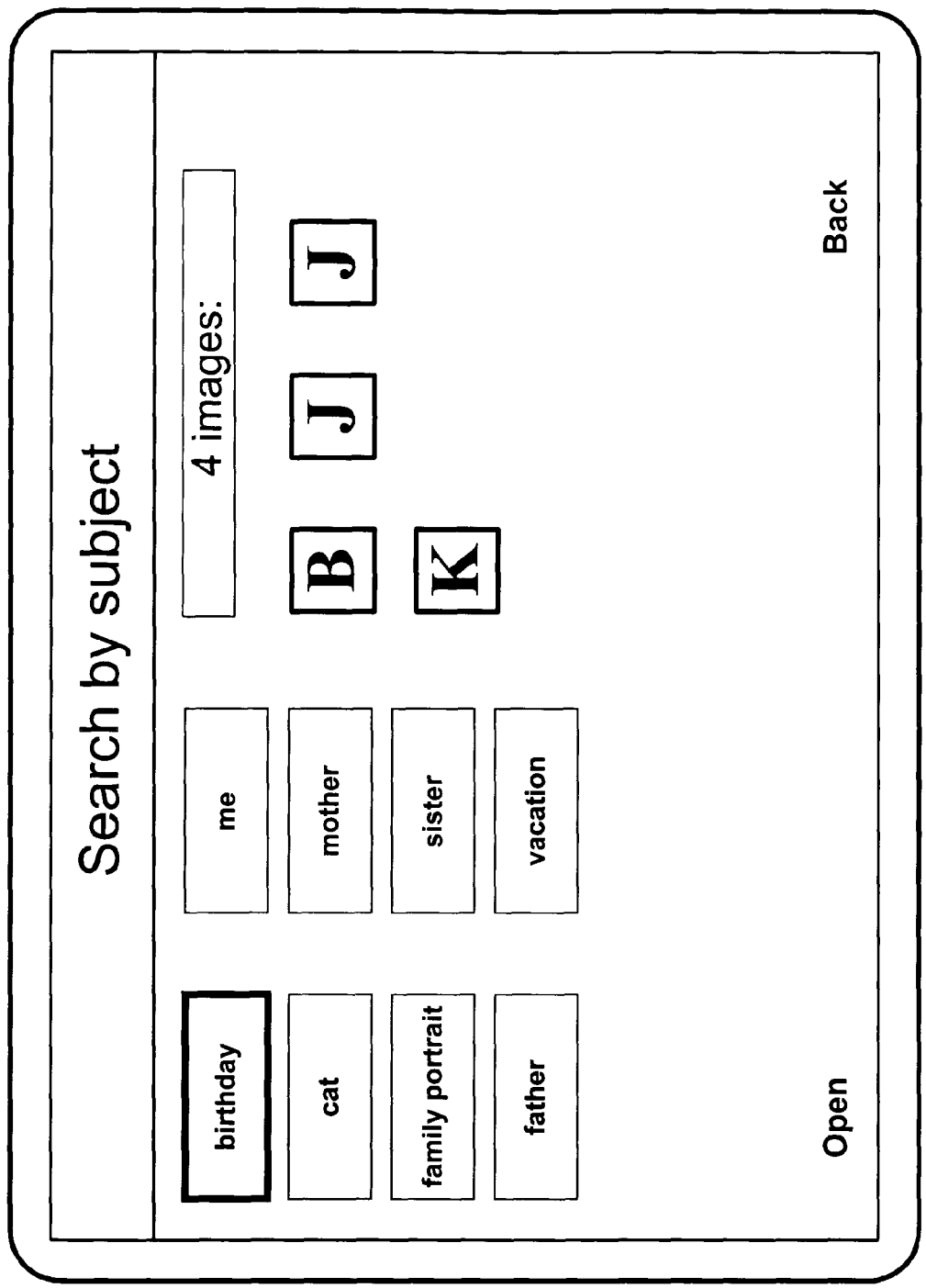
FIGS. 11A & 11B are examples of user interfaces for a subject search of images according to at least one embodiment of the invention.
Figure 11B:
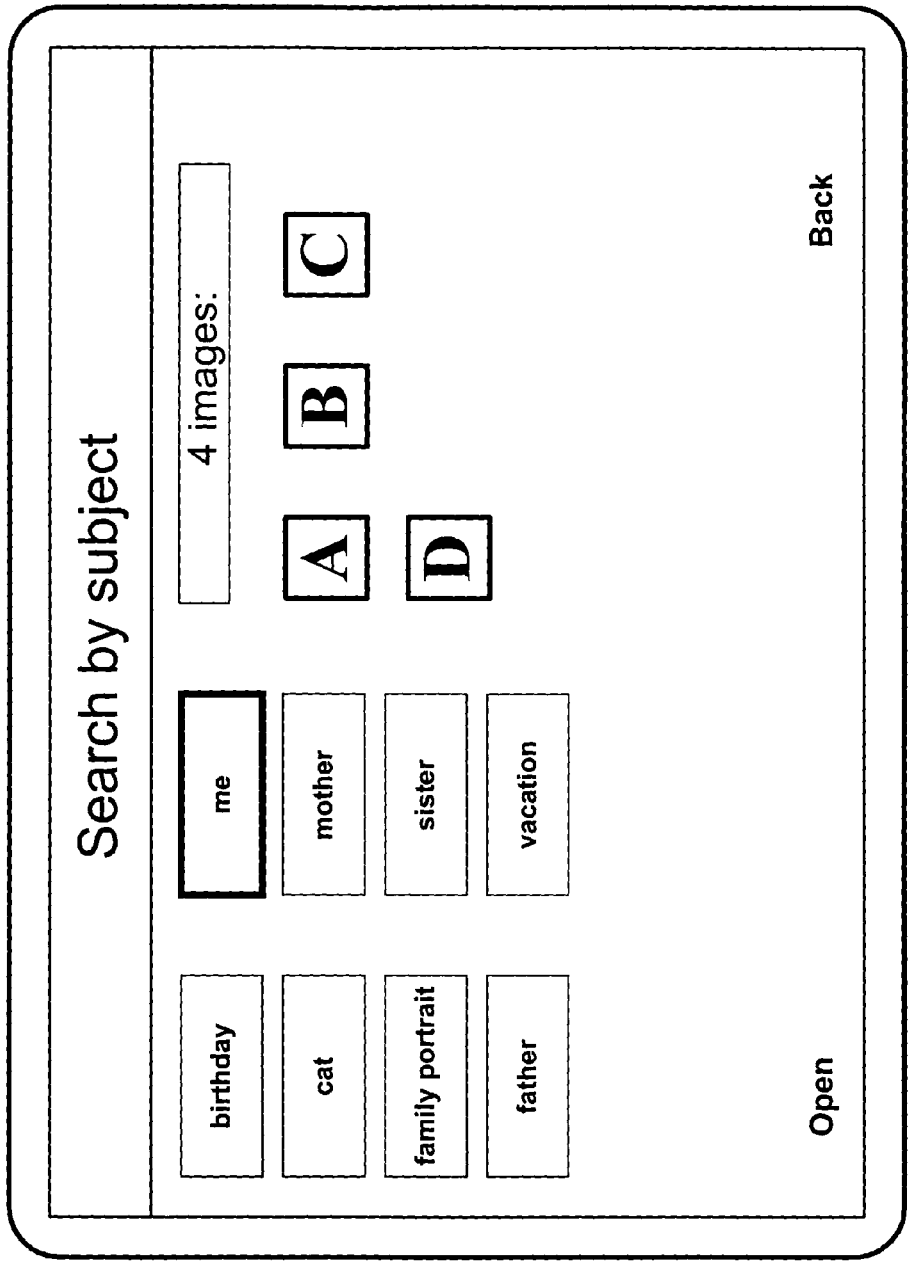

FIGS. 11A & 11B show examples of subject search screens according to an embodiment of the invention. Alternatively, a User Interface (not shown) is provided by which the user enters text to search for specific subjects and/or names for images, albums or boxes.

Figure 12:
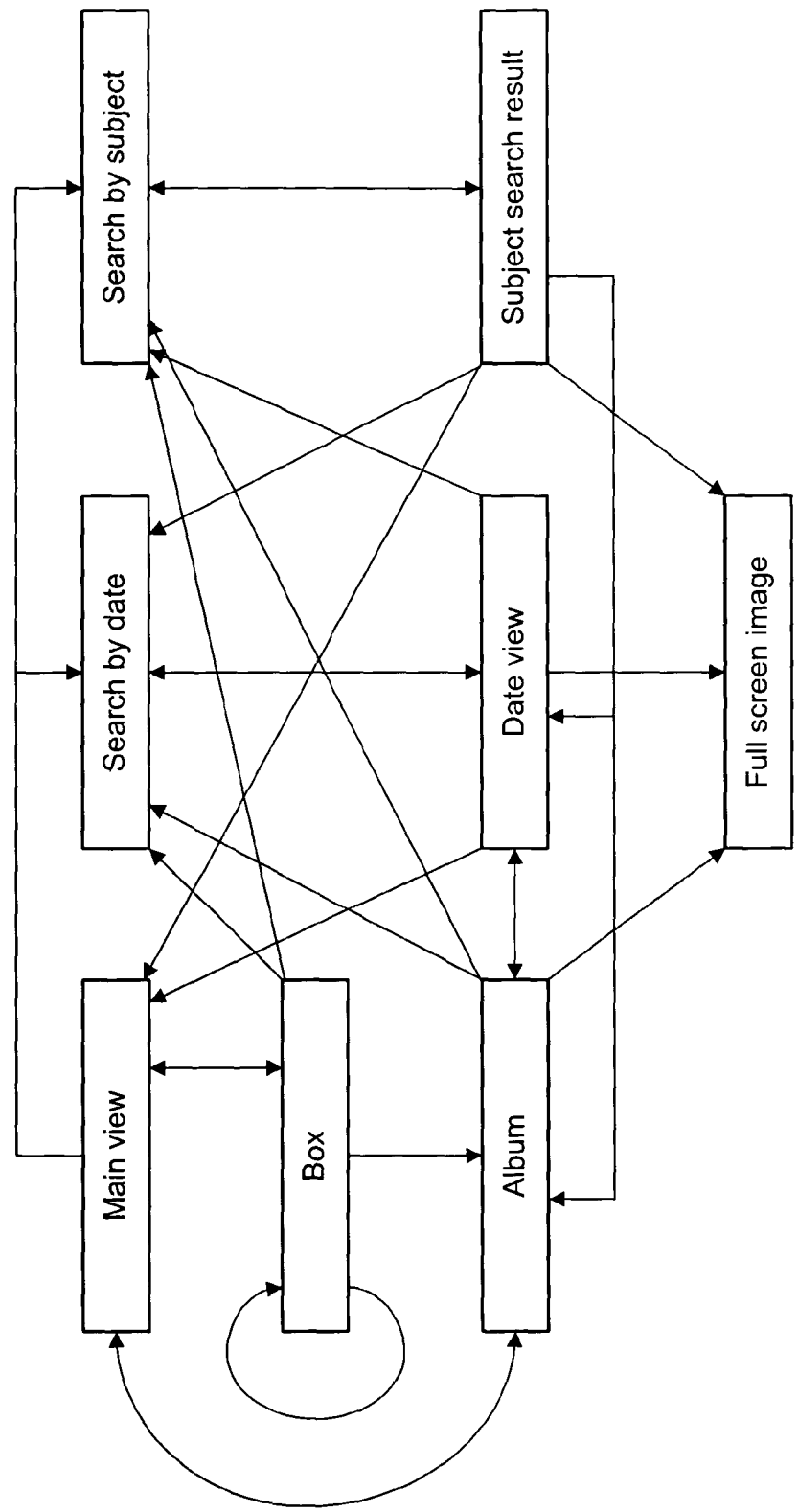
FIG. 12 is a diagram describing navigation among user interfaces according to at least one embodiment of the invention.

FIG. 12 is a diagram showing the paths by which a user can traverse various user interfaces according to one embodiment of the invention. From the Main View, all images associated with a particular user can be date or subject searched (subject to providing necessary passwords). Alternatively, a user can go from a main view to a particular box or album. From a specific box or album, a user can also search by date or name. After searching by date or name, the user goes to the result from that search. In the case of a date search, that result would be, e.g., in the form of the date views of FIG. 10D or 10H. In the case of a name or subject search, that result could be as shown in FIGS. 11A&11B. From the search results, the user can go to a full screen image of a selected thumbnail.

Figure 13A:
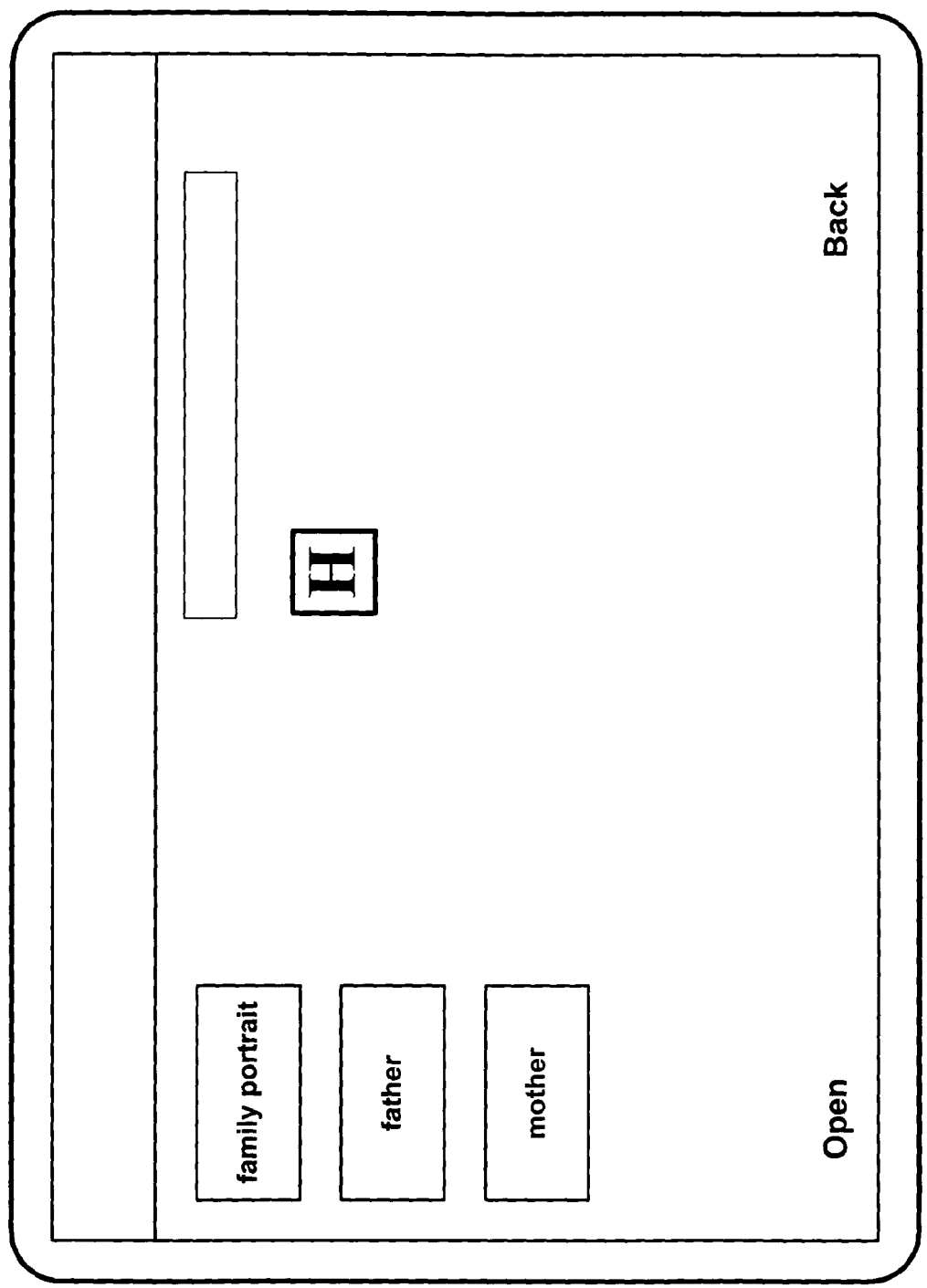
FIGS. 13A & 13B are examples of user interfaces according to at least one embodiment of the invention for browsing between subfolders.
Figure 13B:
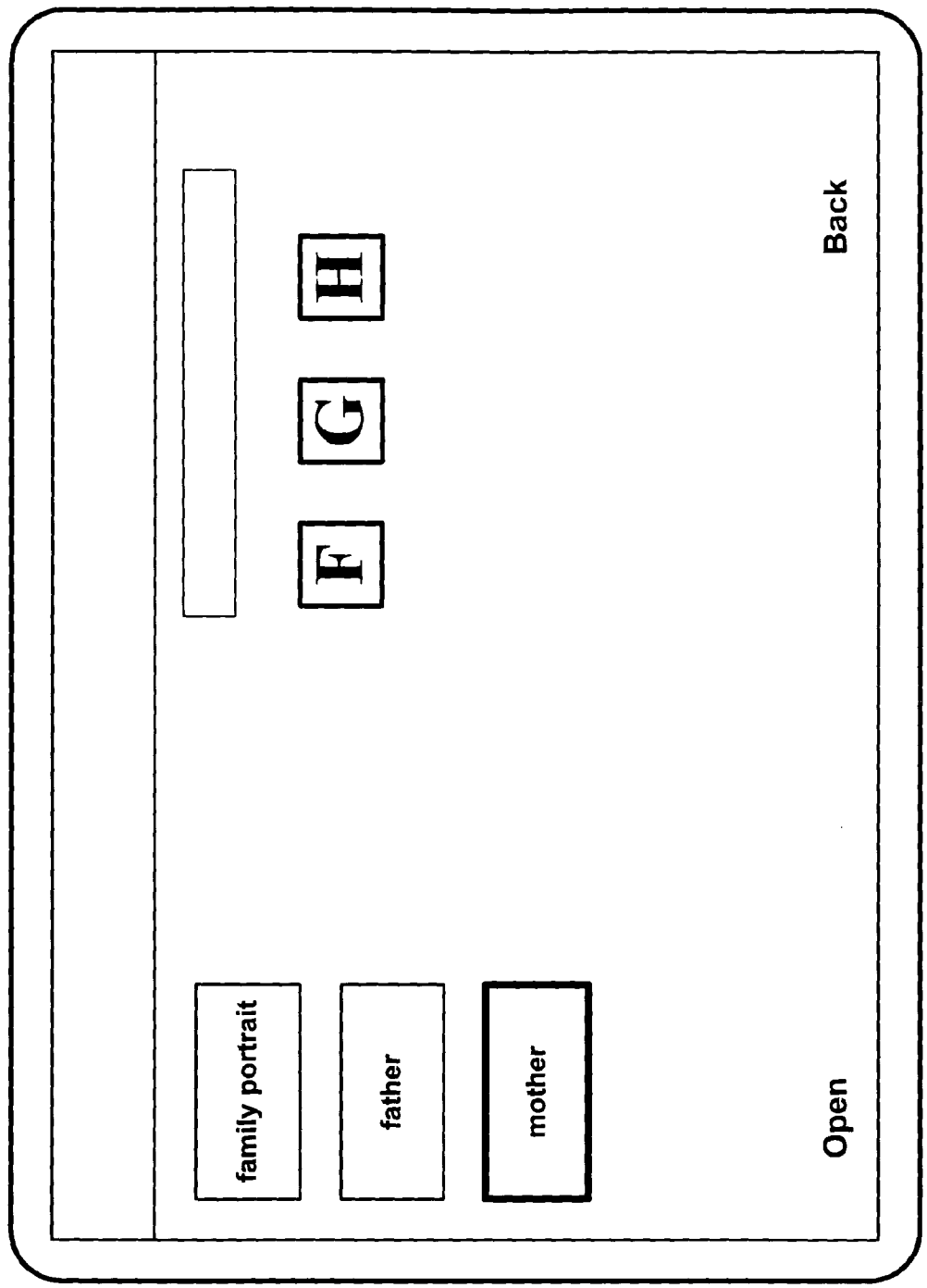

Notably, at least one embodiment permits a user to navigate in both directions between images and folders/subfolders. For example, a user might select an image (e.g., image 108 of FIG. 4, shown as "H"), and then use that image as a seed to find other images in other subfolders where image H resides. For example, a user searching for a picture of his father remembers that pictures were taken at a birthday party for his father. By searching for pictures on the date of his father's birthday, the user reaches the screen of FIG. 10D or of FIG. 10H and sees three thumbnail images of his father ("H", "J" and "K," as described in FIG. 4). If the user wished to see other images in the same month, he could select another day (in the example, December 21). If he wished to see other images in different months of 2002, he could re-select December (thereby causing a return to the screen of FIG. 10B or 10F) and then select March, July or August. The user then notices image "H" showing his father and his mother, and decides that he would also like to view pictures of his mother. By entering an appropriate command, the user is then taken to a screen identifying all albums containing picture "H" (FIG. 13A). After selecting the album marked "mother," the user sees thumbnail images of other images having "mother" as a subject (FIG. 13B). By selecting one of the thumbnails, the user could search other albums containing the newly-selected thumbnail. Alternatively, the user could select one of the image thumbnails of FIG. 13B and (upon entry of an appropriate command) see all images taken on the same date; the user would then be able to reverse date search as described above (i.e., see other images on different days of the same month, on different months of the same year, etc.), search other subject albums containing a selected thumbnail, or otherwise navigate among folders and subfolders. Indeed, and depending on system configuration, a user may further be able to see all boxes containing a selected album or all boxes containing a particular image.

Metadata can be incorporated into images in many ways. Date and/or time data are readily available. For example, many mobile devices have clock and calendar functions and can be configured to insert a date and/or time stamp on an image. As another alternative, date and/or time information can be supplied by a MMSC or SMSC, by server 14, or by another source. Although the date/time data must be in a format that is understood by server 14, this can be accomplished by, e.g., standardized guidelines for cameras and other devices. Subject metadata can also be added in various manners. A user could manually add the subject field at the time of creating or storing an image. A user can also be supplied with suggested subject metadata automatically, and the user can then accept or modify that suggestion. In one embodiment particularly suitable for many mobile devices having calendar application software, a subject field can be supplied from a user's calendar. When the device recognizes that a picture is taken and stored in the device memory, the device would then add time and date information automatically, and may look to current entries in the user's calendar in order to provide a suggestion to the user for the metadata subject field. For example, at the time a user creates an image with a mobile device, the current calendar entry could be "meeting with supervisor." The device might then suggest "meeting with supervisor," "supervisor" and/or "meeting" as subject(s) for the image.

Figure 14:
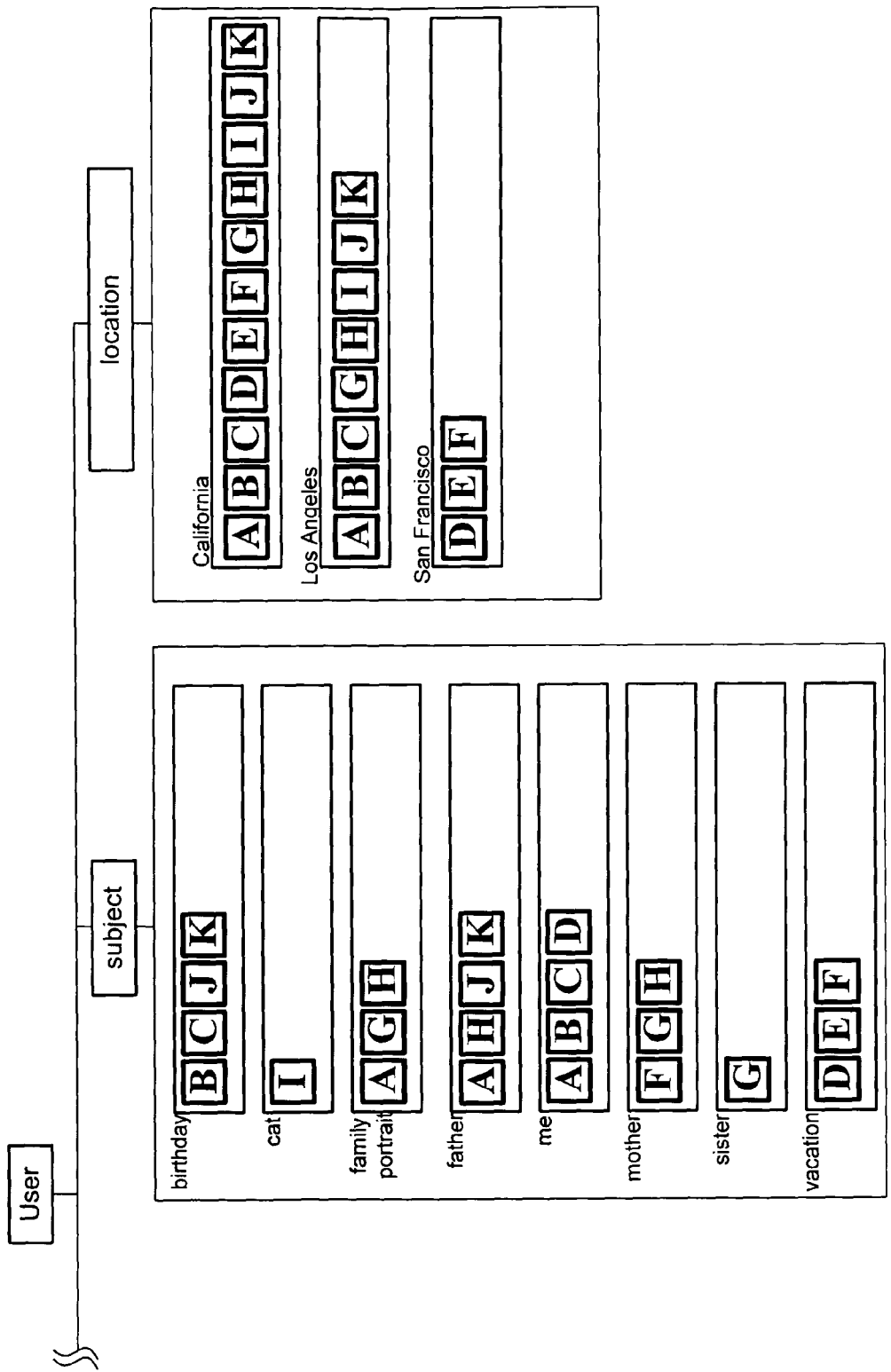
FIG. 14 is a block diagram of a virtual folder and sub-folder structure according to another embodiment of the invention.

FIGS. 14 and 15 show another embodiment of the invention wherein images are also organized and searchable based on geographical location. As shown in FIG. 14, each image for the user is also provided with geographic metadata. This metadata could, but need not necessarily, be the location in which the picture was taken. In other embodiments, this metadata could be added instead of (and not in addition to) the date and/or subject metadata. The geographic metadata could likewise be supplied in various manners. In one embodiment, the user would manually provide the information at the time of image creation, transfer or storage. In some embodiments, application software operating upon a mobile device would suggest geographic information to the user based on calendar entries or other data contained in the mobile device. Geographic information would be obtained by the device based on identification of a base station with which the mobile device is in wireless communication.

Figure 15A:
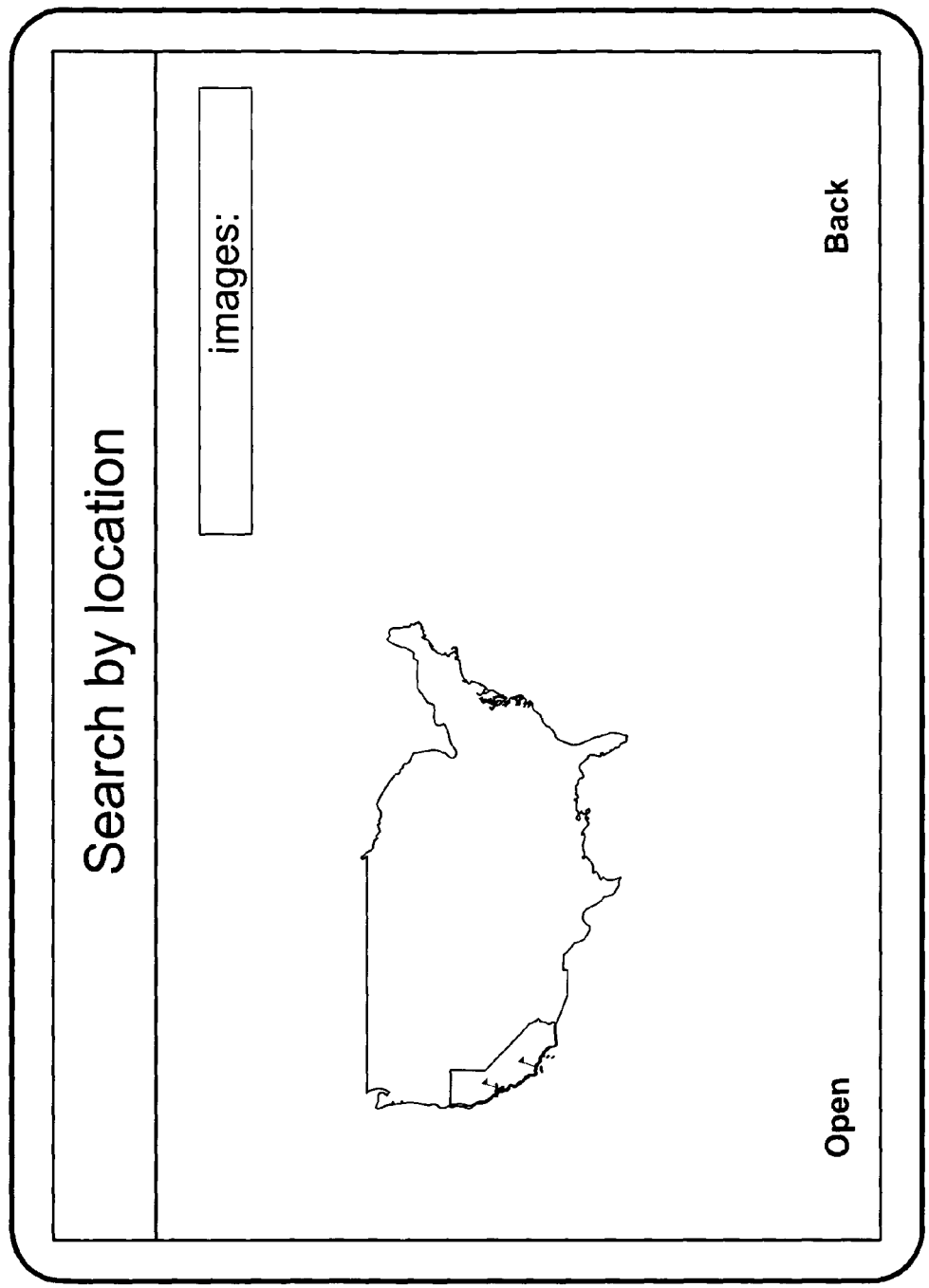
FIGS. 15A & 15B are examples of user interfaces for a location search of images according to at least one embodiment of the invention.
Figure 15B:
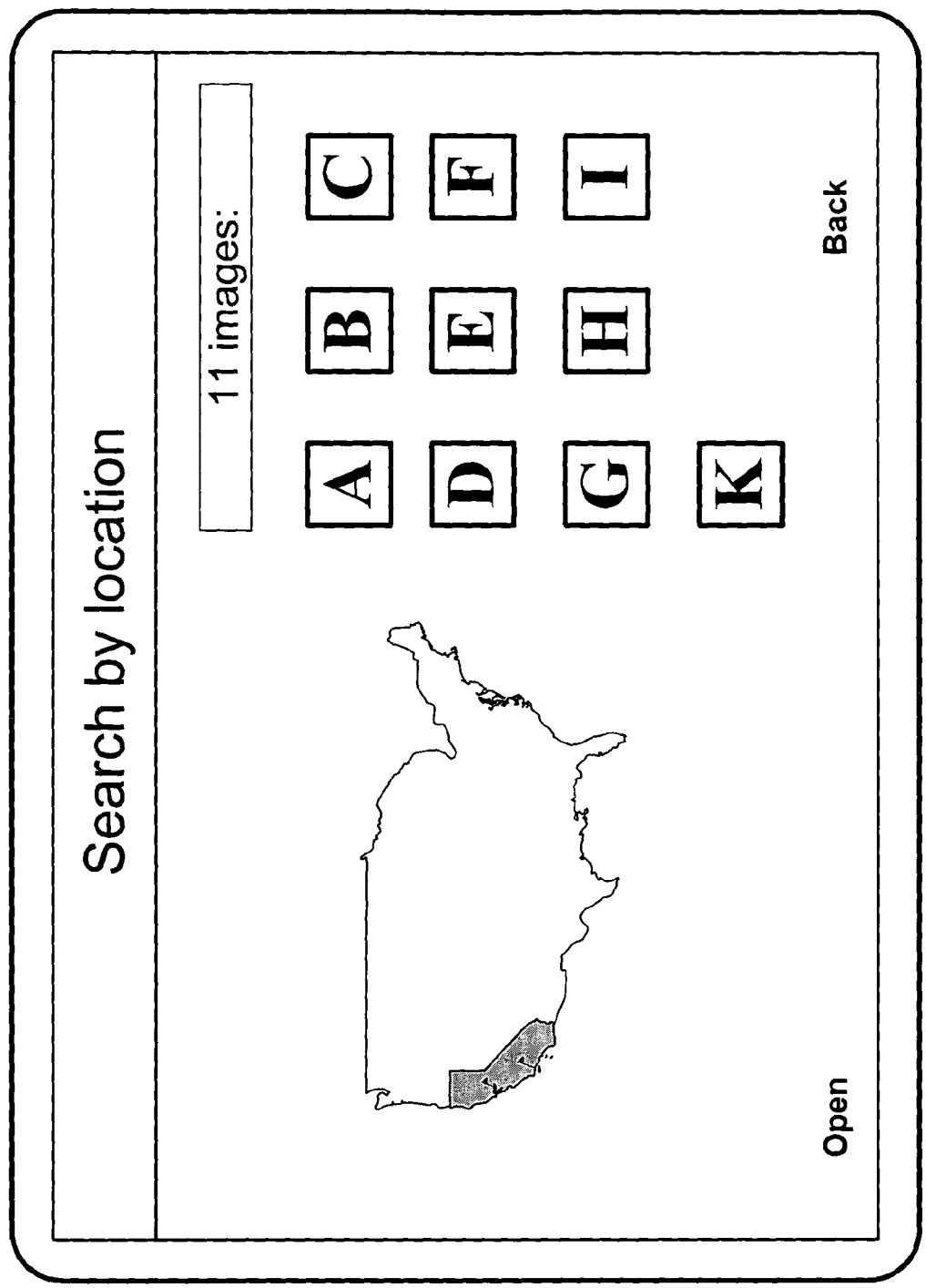

FIGS. 15A & 15B show an example of user interfaces for a geographic image search according to one embodiment of the invention. Upon selecting a geographic search command (which would be included, e.g., in submenu 126 of FIG. 9), a user is provided with a map of a geographic region. Although the United States is displayed in FIG. 15A, other countries or geographic regions could be shown. In FIG. 15A, the map is subdivided into subregions (states in FIG. 15A, although other subdivisions could be used). Each state for which there is associated image data is highlighted or otherwise visually marked (using flag symbols in FIG. 15A). Upon selecting California, and as shown in FIG. 15B, thumbnails for all images having California metadata are displayed. The map could also be regenerated to zoom in upon the selected subregion. Although not shown, a subsequent search page could zoom in upon additional subregions, sub-subregions, etc., with additional flags (or other visual indications) to show that images are associated with various subregions, sub-subregions, etc. Upon selecting a lower level subregion, only thumbnails for that subregion could be shown. If, for example, the flag for San Francisco were selected in FIG. 15B, only thumbnails for images 104-106 ("D," "E" and "F"; see FIG. 14) would be shown. In some embodiments, and similar to the date search described in connection with FIGS. 10A-10D, processor 42 could randomly (or otherwise) choose images for which thumbnails are displayed during portions of a geographic search.

As described in connection with FIGS. 10 and 13, an image thumbnail in a geographic search result of FIG. 15B could be selected and other albums (location, date, subject, or other type) containing the selected thumbnail identified and browsed/searched.

Although specific examples of carrying out the invention have been described, those skilled in the art will appreciate that there are numerous variations and permutations of the above-described systems and methods that are contained within the spirit and scope of the invention as set forth in the appended claims. For example, the user interfaces and screen layouts described are only examples; other user interfaces and screen layouts are within the scope of the invention. Similarly, the data structures, metadata schemes, and naming conventions described could be varied. The invention is not limited to still images, and the invention could also be implemented in connection with, e.g., video data. Images need not be created with a mobile terminal prior to storage; images could be created by a digital camera which must download images by USB connection or by transfer to a removable medium, or by scanning a previously-created drawing, photograph or other document. As yet a further alternative, a machine-readable medium could have machine-executable instructions stored thereon such that, when the instructions are read and executed by an appropriate device (or devices), steps of a method according to the invention are performed. These and other modifications are within the scope of the invention as defined in the attached claims.

We claim:

1. An apparatus comprising:
a memory;
a communications interface configured to connect to a user device through a communication network; and
a processor configured to:
control storage, in the memory, of at least one image received from the user device through the communication network, each received image having associated metadata categorizing said image according to at least two schemes, wherein
said at least two schemes include at least one of an image date, an image location and one or more image subjects, and
each image is stored in a database in the memory, the database including at least one virtual folder corresponding to each of the at least two metadata schemes, each image being stored in a single location within the memory, each virtual folder including a pointer to the image location;
identify a calendar entry in a calendar application based on the image date of the at least one image;
provide a suggestion for entering a metadata subject field of the at least one image based on the calendar entry;
control providing of a user interface with the at least one virtual folder corresponding to each of the at least two metadata schemes;
control displaying in the user interface simultaneous indications of years, months and days that are available for sequential user selection;
control displaying of an indication of the selectable years for which there are stored images having metadata corresponding to an indicated year;
control displaying of an indication of the selectable months for which there are stored images having metadata corresponding to an indicated month; and
control displaying of an indication of the selectable days for which there are stored images having metadata corresponding to an indicated day.

2. The apparatus of claim 1, wherein at least one of the schemes comprises image date, and wherein the processor is further configured to:
control displaying of information regarding images corresponding to the selected one or more indications of years, months and days.

3. The apparatus of claim 2, wherein the information regarding images comprises thumbnail images of the images.

4. The apparatus of claim 1, wherein the processor is further configured to:
control displaying of, upon selection of a year, an indication of the months of the selected year for which there are stored images having metadata corresponding to an indicated month.

5. The apparatus of claim 1, wherein the processor is further configured to:
control displaying of, upon selection of a month, an indication of the days of the selected month for which there are stored images having metadata corresponding to an indicated day.

6. The apparatus of claim 1, wherein the processor is further configured to:
control displaying of, upon selection of an indicated day, information regarding images having metadata corresponding to the selected day.

7. The apparatus of claim 1, wherein the processor is configured to:
control displaying of images corresponding to a selected date;
designate, upon selection of a year or month prior to selection of a day, a day of the selected year or month in which there are available images, and
control displaying of, prior to selection of a day, information regarding images having metadata corresponding to the designated day.

8. The apparatus of claim 7, wherein the processor is configured to designate the day by randomly choosing a day of the selected year or month in which there are available images.

9. The apparatus of claim 7, wherein the processor is configured to designate the day by choosing the first day in a numerically ordered series of days in which there are available images.

10. The apparatus of claim 1, wherein one of the schemes comprises image location, and wherein the processor is further configured to:
control providing of a user interface to select a map subregion of a displayed map region, and
control displaying of, upon selection of the map subregion, information regarding images having metadata corresponding to the selected map subregion.

11. The apparatus of claim 10, wherein the processor is further configured to control displaying of, as part of the user interface to select a subregion, an indication of the subregions for which there are stored images having metadata corresponding to an indicated subregion.

12. The apparatus of claim 10, wherein the processor is further configured to:
control providing of a user interface to select a sub-subregion of the selected subregion, the interface comprising an indication of the sub-subregions for which there are stored images having metadata corresponding to an indicated sub-subregion.

13. The apparatus of claim 1, wherein the processor is configured to:
group, upon designation of stored images by a user, the designated images into a user-defined image folder, and
group, upon designation of one or more image folders by a user, the designated folders into a higher level folder.

14. The apparatus of claim 1, wherein at least one of the two schemes comprises multiple subcategories, and wherein each image is indexed by each applicable subcategory.

15. The apparatus of claim 14, wherein the at least one scheme comprises image date, and wherein the subcategories comprise year of image creation and month of image creation.

16. The apparatus of claim 14, wherein the at least one scheme comprises one or more image subjects, and wherein the subcategories comprises individual subjects of at least one multisubject image.

17. The apparatus of claim 14, wherein the at least one scheme comprises image location, and wherein the subcategories comprise a region and a subregion.

18. The apparatus of claim 1, wherein the processor is further configured to identify, after selection of an image by a user, other images having metadata in common with the selected image, wherein the common metadata is metadata other than the metadata utilized to initially search for the selected image.

19. The apparatus of claim 1, wherein the processor is configured to:
control displaying of information about images in a first image group,
receive a selection of a first image from the first group,
control displaying of information about additional image groups of which the first image is also a member, and
control displaying of, upon selection from the additional image groups of a second image group, information about images in the second image group.

20. The apparatus of claim 19, wherein:
one of the schemes is one or more image subjects,
the first image has associated metadata categorizing the image according to multiple subjects of the image,
the first image group comprises other images having metadata corresponding to one of the multiple subjects, and
the second image group comprises images having metadata corresponding to another of the multiple subjects.

21. The apparatus of claim 1, and wherein the processor is further configured to:
control providing of a user interface to select at least one date component comprising a year, a month or a day,
control displaying of information regarding images in a date-based group, each image in the date-based group having metadata corresponding to the selected date component,
receive a selection of an image in the date-based group,
control displaying of information about first and second subject-based groups, the first subject-based group containing images having metadata corresponding to a first subject of the selected image, and the second subject-based group containing images having metadata corresponding to a second subject of the selected image,
receive a selection of the first subject-based group, and
control displaying of information regarding images in the first subject-based group.

22. The apparatus of claim 1, wherein the processor is configured to control storing of images for multiple users, wherein the images are organized by user.

23. The apparatus of claim 1, wherein the user interface is delivered to a user device.

24. The apparatus of claim 1, wherein the user device is a mobile device and the communication network is a wireless communication network.

25. The apparatus of claim 24, wherein the user interface is controllable by the mobile device.

26. A machine-readable medium having machine-executable instructions that, when executed, cause a machine to perform:
controlling storage of images transmitted through a communication network in a memory, each image having associated metadata categorizing said image according to at least two schemes, wherein
said at least two schemes include at least one of an image date, an image location and one or more image subjects, and
the images are stored in a database having at least one virtual folder corresponding to each of the at least two metadata schemes, a copy of each image being stored in a single location within the memory, each virtual folder including a pointer to the image location,
identifying a calendar entry in a calendar application based on the image date of at least one image,
providing a suggestion for entering a metadata subject field of the at least one image based on the calendar entry,
controlling providing of a user interface with the at least one virtual folder,
controlling displaying in the user interface simultaneous indications of years, months and days that are available for sequential user selection, controlling displaying of an indication of the selectable years for which there are stored images having metadata corresponding to an indicated year, controlling displaying of an indication of the selectable months for which there are stored images having metadata corresponding to an indicated month, and controlling displaying of an indication of the selectable days for which there are stored images having metadata corresponding to an indicated day.

27. The machine-readable medium of claim 26, wherein one of the schemes comprises image date, and wherein the machine-executable instructions, when executed, cause the machine to control displaying of information regarding images corresponding to the selected one or more indications of years, months and days.

28. The machine-readable medium of claim 26, wherein one of the schemes comprises image location, and wherein the machine-executable instructions, when executed, cause the machine to:

control providing of a user interface to select a subregion of a displayed region, and control displaying of, upon selection of a subregion, information regarding images having metadata corresponding to the selected subregion.

29. The machine-readable medium of claim 26, wherein one of the schemes comprises image date and one of the schemes comprises one or more image subjects, and wherein the machine-executable instructions, when executed, cause the machine to:

control providing of a user interface to select at least one date component comprising a year, a month or a day, control displaying of information regarding images in a date-based group, each image in the date-based group having metadata corresponding to a selected date component, receive a selection of an image in the date-based group, control displaying of information about first and second subject-based groups, the first subject-based group containing images having metadata corresponding to a first subject of the selected image, and the second subject-based group containing images having metadata corresponding to a second subject of the selected image, receive a selection of the first subject-based group, and control displaying of information regarding images in the first subject-based group.

30. A method comprising:

storing images in a database in a memory, each image having associated metadata categorizing said image according to at least two schemes, the database including at least one virtual folder corresponding to each of the at least two metadata schemes, a copy of each image being stored in a single location within the memory, each virtual folder including a pointer to the image location, identifying, by a processor, a calendar entry in a calendar application based on an image date of at least one image, providing a suggestion for entering a metadata subject field of the at least one image based on the calendar entry, controlling providing of a user interface with the at least one virtual folder, controlling displaying in the user interface simultaneous indications of years, months and days that are available for sequential user selection, controlling displaying of an indication of the selectable years for which there are stored images having metadata corresponding to an indicated year, controlling displaying of an indication of the selectable months for which there are stored images having metadata corresponding to an indicated month, and controlling displaying of an indication of the selectable days for which there are stored images having metadata corresponding to an indicated day.

31. The method according to claim 30, said at least two schemes including at least one of an image date, an image location, and one or more image subjects.

32. The method according to claim 30, where at least one of the schemes comprises image date, the method further comprising controlling displaying of information regarding images corresponding to the selected one or more indications of years, months and days.

33. The method of claim 30, further comprising controlling displaying of, upon selection of a year, an indication of the months of the selected year for which there are stored images having metadata corresponding to an indicated month.

34. The method of claim 30, further comprising controlling displaying of, upon selection of a month, an indication of the days of the selected month for which there stored images having metadata corresponding to an indicated day.

35. The method of claim 30, further comprising controlling displaying of, upon selection of an indicated day, information regarding images having metadata corresponding to the selected day.

36. The method according to claim 30, wherein one of the schemes comprises image date and one of the schemes comprises one or more image subjects, further comprising:

controlling providing of a user interface to select at least one date component comprising a year, a month or a day, controlling displaying of information regarding images in a date-based group, each image in the date-based group having metadata corresponding to the selected date component, receiving a selection of an image in the date-based group, controlling displaying of information about first and second subject-based groups, the first subject-based group containing images having metadata corresponding to a first subject of the selected image, and the second subject-based group containing images having metadata corresponding to a second subject of the selected image, receiving a selection of the first subject-based group, and controlling displaying of information regarding images in the first subject-based group.

37. An apparatus comprising:

a memory;

a communications interface configured to connect to a user device through a communication network; and a processor configured to:

store, in the memory, at least one image received from the user device through the communication network, each received image having associated metadata categorizing said image according to at least two schemes, wherein said at least two schemes include at least one of an image date, an image location and one or more image subjects, and each image is stored in a database in the memory, the database including at least one virtual folder corresponding to each of the at least two metadata schemes, each image being stored in a single location within the memory, and each virtual folder including a pointer of the each image to the image location, wherein the processor is configured to identify, after selection of an image in one virtual folder by a user, other images having metadata in common with the selected image, wherein the common metadata is metadata other than the metadata utilized to initially create the virtual folder, identify a calendar entry in a calendar application based on the image date of the at least one image;

provide a suggestion for entering a metadata subject field of the at least one image based on the calendar entry, control providing of a user interface with the at least one virtual folder;

control displaying in the user interface simultaneous indications of years, months and days that are available for sequential user selection;

control displaying an indication of selectable years for which there are stored images having metadata corresponding to an indicated year;

control displaying an indication of selectable months for which there are stored images having metadata corresponding to an indicated month; and control displaying of an indication of selectable days for which there are stored images having metadata corresponding to an indicated day.

38. A method comprising:

storing images in a database in a memory, each image having associated metadata categorizing said image according to at least two schemes, the database including at least one virtual folder corresponding to each of the at least two metadata schemes, a copy of each image being stored in a single location within the memory, each virtual folder including a pointer to the image location, wherein a processor is configured to identify, after selection of an image in one virtual folder by a user, other images having metadata in common with the selected image, wherein the common metadata is metadata other than the metadata utilized to initially create the virtual folder, identifying, by the processor, a calendar entry in a calendar application based on an image date of at least one image, providing a suggestion for entering a metadata subject field of the at least one image based on the calendar entry, controlling providing of a user interface with the at least one virtual folder, controlling displaying in the user interface simultaneous indications of years, months and days that are available for sequential user selection, controlling displaying of an indication of the selectable years for which there are stored images having metadata corresponding to an indicated year, controlling displaying of an indication of the selectable months for which there are stored images having metadata corresponding to an indicated month, and controlling displaying of an indication of the selectable days for which there are stored images having metadata corresponding to an indicated day.

* * * * *